US006231968B1

(12) United States Patent
Hiramoto et al.

(10) Patent No.: US 6,231,968 B1
(45) Date of Patent: May 15, 2001

(54) MAGNETIC THIN FILM AND MAGNETIC DEVICE USING THE SAME

(75) Inventors: Masayoshi Hiramoto; Nozomu Matsukawa, both of Nara; Hiroshi Sakakima, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/083,824

(22) Filed: May 22, 1998

(30) Foreign Application Priority Data

Sep. 4, 1997 (JP) .................................................. 9-240067

(51) Int. Cl.[7] ........................................................ G11B 5/66

(52) U.S. Cl. ...................... 428/332; 428/336; 428/694 T; 428/694 TS; 428/900

(58) Field of Search .......................... 428/694 T, 694 TS, 428/900, 332, 336

(56) References Cited

U.S. PATENT DOCUMENTS

| | | | | |
|---|---|---|---|---|
| 4,726,988 | * | 2/1988 | Oka | 428/307.3 |
| 4,969,962 | * | 11/1990 | Watanabe | 148/306 |
| 5,154,983 | * | 10/1992 | Watanabe | 428/611 |

FOREIGN PATENT DOCUMENTS

| | | | |
|---|---|---|---|
| 0 418 804 | | 3/1991 | (EP) . |
| 0 442 760 | | 8/1991 | (EP) . |
| 0442760 | * | 8/1991 | (EP) . |
| 7-111221 | | 4/1995 | (JP) . |
| 9-35935 | | 2/1997 | (JP) . |

OTHER PUBLICATIONS

N. Hasegawa et al., "Crystallization Behavior of Fe—M—C(M=Ti, Zr, Hr, V, Nb, Ta)Films" *Journal of Japan Applied Magnetism*, vol. 14, No. 2, pp. 319–322 (with English abstract), 1990.

G. Herzer, "Grain Size Dependence of Coercivity and Permeability in Nanocrystalline Ferromagnets" *IEEE Transactions on Magnetics*, vol. 26, No. 5, pp. 1397–1402, Sep. 1990.

Y. Shimada et al., "Nanostructure of Magnetically Soft Films" *Journal of Japan Applied Magnetism*, vol. 20, No. 6, pp. 960–965 (with English abstract), 1996.

Journal of Magnetism and Magnetic Materials, "Structure and magnetic properties of Fe—Cr—N sputter—deposited films", D.L. Peng et al., pp. 41–52, Jan. 27, 1997.

Herzera "Grain Size Dependence . . . " IEEE Transaction on Magnetics, vol. 26, No. 5, Sep. 1990.*

* cited by examiner

*Primary Examiner*—Leszek Kiliman
(74) *Attorney, Agent, or Firm*—Merchant & Gould P.C.

(57) ABSTRACT

The present invention provides a soft magnetic thin film having high reliability that is useful in a magnetic device such as a magnetic head, where the degradation of heat stability due to a high saturation magnetic flux density of the soft magnetic thin film, the degradation of resistance against surroundings and substrate breakage are suppressed. The magnetic thin film of the present invention comprises a magnetic film comprising approximately columnar, needle or branched magnetic crystal grains as a mother phase, which is formed by sputtering or the like. The magnetic crystal grains have an average maximum length more than 50 nm, and an average crystal size in a short direction of the approximately columnar or needle shape is more than 5 nm and less than 60 nm.

46 Claims, 3 Drawing Sheets

MAGNETIC THIN FILM AND MAGNETIC DEVICE USING THE SAME

BACKGROUND OF THE INVENTION

1. Field of the Invention

The present invention relates to a magnetic thin film and a magnetic device using the same. More specifically, the present invention relates to a soft magnetic thin film that is useful for a magnetic recording head, a magnetic reproducing head, a magnetic sensor including a magnetic impedance sensor, a magnetic circuit component such as a magnetic coil and an inductor, or magnetic inductance heating equipment such as an IH rice cooker and an IH hot plate, and a magnetic device such as a magnetic head, a magnetic sensor, a magnetic circuit component, and magnetic inductance heating equipment using the soft magnetic thin film.

2. Description of the Prior Art

A magnetic material having both an excellent magnetic property and a high saturation magnetic flux density has been demanded in the field of a magnetic device using a soft magnetic material. To be specific, an improvement in the writing ability of a magnetic head involved in the improvement in magnetic recording density, an improvement in the rate of change of magnetic impedance of a magnetic impedance sensor, and an improvement in the efficiency of the conversion from electromagnetism to heat of magnetic inductance heating equipment are desired. In order to seek a material satisfying those demands, transition metal (Fe, Co)—IIIa to Va or IIIb to Vb based-materials have been recently studied in a wide range (e.g., Hasegawa: Journal of Japan Applied Magnetism, 14, 319–322 (1990), NAGO IEEE, Trans, magn., Vol. 28, No.5 (1992)). These many studies have established that it is important that a material exhibiting a soft magnetic property among the aforementioned compositions has an amorphous phase or a microcrystal phase close to the amorphous phase immediately after the formation of a film, then grains are growth by a heat treatment or the like, and the material finally has a granular structure. Furthermore, in regard to the crystal size of the granular particles, many researchers including Herzer (IEEE, Trans. magn., MAG-26, 1397 (1990), Journal of Japan Applied Magnetism Vol. 20. No.6 (1996)) have confirmed the followings. An excellent soft magnetic property can be produced, only when an average crystal size of magnetic crystal grains is sufficiently smaller than a distance of exchange coupling or sufficiently larger than that. According to many reports, the mechanism of this production is as follows. In a region with large crystal grains, domain wall motion due to defects or reduction in a grain boundary density or easiness of magnetization rotation produces the soft magnetic property. On the other hand, in a region with small crystal grains, the soft magnetic property is realized in the following manner: each microcrystal grain significantly interacts with adjacent microcrystal grains for three-dimensional exchange so as to offset each crystal magnetic anisotropy, and thus reducing an apparent crystal magnetic anisotropy.

A microcrystal material in which precipitated or grown microcrystal grains are substantially composed of a magnetic metal (e.g., Fe, FeCo), especially a material having a high saturation magnetic flux density of 1.2 T or more, poses a problem of corrosion resistance. Therefore, an improvement in corrosion resistance is attempted by dissolving an element such as Al that forms a passive state in α-Fe. However, an anti-corrosion element forming a passive state such as Al basically preferentially reacts with a light element such as oxygen, nitrogen, carbon, or boron used for producing an amorphous state or making crystal grains smaller, because it has a low free energy for the formation of an oxide and a nitride. Thus, the anti-corrosion element is unlikely to remain in a solid solution with α-Fe microcrystals. In the case that an amount sufficient to provide corrosion resistance is added to the α-Fe microcrystals, the saturation magnetic flux density is lowered significantly.

On the other hand, when these magnetic materials are used for a magnetic head, the material is subjected to a heat treatment in a process for fusing with a glass that is necessary for producing a magnetic head. The melting point of the glass, the coefficients of thermal expansion of the substrate, the glass and the magnetic film, the optimum microcrystal precipitation temperature of the magnetic material and the matching of them influence the characteristics of the magnetic head. The temperature for the heat treatment to produce a head is preferably 500° C. or more in view of the reliability of the glass and the optimum temperature for the heat treatment for the magnetic material.

When the magnetic head is a metal-in gap head (MIG head) in which a magnetic thin film is formed, for example on ferrite, when the temperature in the heat treatment is excessively high, a reaction proceeds at the interface between the ferrite and the magnetic film, so that a magnetism-degraded layer produced at the interface between the magnetic film and the ferrite becomes thicker, and thus pseudo-gap noise becomes larger. In the case of a LAM head in which a magnetic thin film and an insulating film are laminated on a non-magnetic substrate, the magnetic film has a different coefficient of thermal expansion from that of the substrate. Therefore, thermal stress between the magnetic film and the substrate becomes larger as the temperature in the heat treatment is higher. Thus, the soft magnetic property of the film is degraded due to an increase of anisotropic energy caused by an inverse magnetostriction effect. Therefore, it is desired that the optimum temperature in the heat treatment for the magnetic material is about 550° C. or less.

However, as described above, the microcrystal material comprising a sufficient amount of an anti-corrosion element in the solid solution with metal microcrystals is required to be subjected to a heat treatment at a temperature in the vicinity of 600 and 700° C. or more in order to stabilize the crystal structure and allow a sufficiently small magnetostriction constant.

Furthermore, these microcrystal magnetic thin films inherently have a number of interfaces present between magnetic particles per unit volume. Therefore, magnetic crystal grains are grown significantly during a heat treatment by using the interface energy as a driving force. This results in a narrow range of the optimum temperature in the heat treatment exhibiting a satisfactory soft magnetic property, heterogeneous properties and a limited range of the temperature for use.

On the other hand, peeling of a film from a substrate due to internal stress and a fine crack on a substrate are problems common to many thin film materials. For example, the internal stress of a film that is formed on a substrate by sputtering generally includes compression stress or tensile stress. When the adhesive strength between a substrate and a film or the breaking strength of a substrate material is weak, the problem of peeling of the film occurs, depending on the shape or the surface state of the substrate.

SUMMARY OF THE INVENTION

In view of the above-mentioned problems such as heat stability or corrosion resistance involved in making a saturation magnetic flux density of a soft magnetic thin film material higher, it is the object of the present invention to provide a magnetic thin film having excellent reliability and a soft magnetic property, and a magnetic device using the same.

In order to solve the above-mentioned problems in the prior art, the inventors more closely studied a magnetic material having an intermediate structure in a region between a region where a granular structure is formed and a region where large columnar crystal grains are realized as shown in FIG. 3, which has been conventionally believed to provide poor characteristics.

In order to solve the above-mentioned problems in the prior art, the inventors also studied the composition of a magnetic material, and the conditions and the composition of an underlying film that can realize the optimum structure.

A magnetic thin film of the present invention comprises a magnetic film including magnetic crystal grains as a mother phase (a main phase).

The magnetic crystal grains have an approximately columnar or needle shape or a branched shape composed of the combination of approximately columnar or needle shapes, and the magnetic crystal grains have an average maximum length more than 50 nm, and an average crystal size in a short direction of the approximately columnar or needle shape is more than 5 nm and less than 60 nm.

The magnetic crystal grain of the magnetic thin film of the present invention is larger than a conventional microcrystal material to such an extent that the average maximum length (average crystal size) in the longitudinal direction of the approximately needle or columnar portions of approximately needle, columnar or branched crystals is 50 nm or more. Accordingly, the interface energy per unit volume is small, so that crystal grains are hardly grown. Therefore, the heat treatment stability in a wide range of temperatures can be realized. Furthermore, it is generally acknowledged that the columnar or needle crystal structure causes the degradation of the magnetic property due to the anisotropy in the shape. In the present invention, nevertheless, since the surface area per volume of a crystal grain is large, the crystal grains significantly interact with each other in the form of exchange. This suppresses the magnetic anisotropy in the shape, and thus improves the soft magnetic property. Furthermore, when the size and the shape of the magnetic crystal grain are in the above-described range, an electric potential difference between crystal grains based on non-uniformity of electrochemical potentials between the crystal grains is decreased, and the corrosion due to the effect of local cell is suppressed. Thus, the corrosion resistance is improved. For a magnetic thin film having an average crystal size in the short direction of 60 nm or more, it is difficult to realize a high saturation magnetic flux density of 1.2 T or more and the soft magnetic property and the corrosion resistance at the same time. When the average crystal size is 5 nm or less, a satisfactory heat treatment stability in a wide range of temperatures cannot be obtained.

In one embodiment of the magnetic thin film of the present invention, the magnetic crystal grains have an average volume Va and an average surface area Sa satisfying the following inequality:

$$Sa > 4.84\, Va^{2/3} \quad [1]$$

According to another embodiment of the present invention, a magnetic thin film comprises a magnetic film including approximately columnar or needle magnetic crystal grains as a mother phase. An average crystal size dS in a short direction of the magnetic crystal grain and an average crystal size dL in a longitudinal direction of the magnetic crystal grain satisfy the following inequalities, respectively:

$$5\text{ nm} < dS < 60\text{ nm} \quad [2]$$

$$dL > 100\text{ nm} \quad [3]$$

According to still another embodiment of the present invention, a magnetic thin film comprises a magnetic film including magnetic crystal grains. The magnetic crystal grains include branched crystal grains composed of the combination of approximately columnar or needle shapes as a mother phase. An average crystal size ds in a short direction of the approximately columnar or needle shape and an average maximum length dl of the branched crystal grains satisfy the following inequalities, respectively:

$$5\text{ nm} < ds < 60\text{ nm} \quad [4]$$

$$dl > 50\text{ nm} \quad [5]$$

According to these embodiments, an excellent soft magnetic property and heat treatment stability of the soft magnetic property in a wide range of temperatures can be realized while a high saturation magnetic flux density (e.g., 1.2 T or more) is retained. In addition, corrosion resistance is improved. The magnetic crystal grains of the magnetic thin film of the present invention are approximately needle or columnar or branched crystal grains, and the average diameter of the crystal grains is larger than that of a conventional microcrystal material. Accordingly, the interface energy per unit volume is small, so that the crystal grain growth is difficult. Therefore, the heat treatment stability in a wide range of temperatures can be realized. Furthermore, the crystal grains significantly interact with each other, so that the magnetic anisotropy in the shape is suppressed, and the crystal magnetic anisotropy in the short direction between crystal grains is offset, so that an excellent soft magnetic property is generated. Furthermore, when the size and the shape of the magnetic crystal grain are in the range shown in Inequalities [2] and [3] (or Inequalities [4] and [5]), an electric potential difference between crystal grains based on non-uniformity of electrochemical potentials between the crystal grains is decreased, and the corrosion due to the effect of local cell is suppressed. Thus, the corrosion resistance is improved. When dS (or ds) is 60 nm or more, it is difficult to realize a high saturation magnetic flux density of 1.2 T or more and the soft magnetic property and the corrosion resistance at the same time. When dS (or ds) is 5 nm or less, the heat treatment stability in a wide range of temperatures is not excellent. Similarly, when dL is 100 nm or less (or dl is 50 nm or less), the heat stability is not excellent.

In one embodiment of the magnetic thin film of the present invention, the crystal orientations of adjacent magnetic crystal grains are preferably different from each other at least in an inplane direction. According to this preferable embodiment, the offset ratio of the magnetic anisotropy is improved, and the crystal magnetic anisotropy of adjacent needle, columnar or branched crystal grains is apparently reduced. Thus, the soft magnetic property can be improved.

In another embodiment of the magnetic thin film of the present invention, the magnetic thin film preferably comprises at least one element selected from the group consisting of C, B, O and N, and an element having a lower free energy for the formation of an oxide and/or a nitride than Fe.

For example, in the case that the magnetic film is produced by sputtering, the formation of a solid solution of a light element such as C, B, O, and N with a metal magnetic element and the reaction of the light element with an element having a lower free energy for the formation of an oxide and/or a nitride than Fe allow control of the coupling of island crystal structures occurring in an early stage of growth on a substrate or the coupling between the crystal grains during the growth. Thus, the film structure where the crystal grains have preferable shapes such as needle, columnar or branched shapes so as to have a large surface area per volume of the crystal grain can be realized. In particular, the combination of a plurality of the above-described elements produces reaction products having various free energies and intermediate products thereof. Therefore, a small amount of the additives as a whole can realize the above-described film structure. As a result, the high saturation magnetic flux density of the magnetic metal can be maintained.

In yet another embodiment of the magnetic thin film of the present invention, the magnetic crystal grains preferably comprise an element having a lower free energy for the formation of an oxide and/or a nitride than Fe.

In a conventional microcrystal material obtained by the precipitation of an amorphous source, a large amount of the element is precipitated in the grain boundary by a heat treatment process. On the other hand, according to this preferable embodiment, a film is formed in the state where the element is dissolved in the magnetic metal crystal grains as a solid solution. Therefore, a small amount of the added element can be sufficient to form an oxide protective film on the surfaces of the magnetic crystal grains. Furthermore, the element controls an early grain shape on the substrate, and consequently serves to form a magnetic film having the preferable crystal grain size and shape of the present invention.

In another embodiment of the magnetic thin film of the present invention, the element having a lower free energy for the formation of an oxide and/or a nitride than Fe is preferably at least one element selected from the group consisting of elements of Group IVa (Ti, Zr, Hf), elements of Group Va (V, Nb, Ta), Al, Ga, Si, Ge and Cr.

In this specification, elements of Groups IIIa, IVa and Va are transition elements.

The use of these elements in a small amount can achieve the preferable film structure of the present invention, and a high corrosion resistance and an excellent magnetic property can be realized at the same time. It is believed that this is involved in a relatively high rate of diffusion of these elements in the magnetic metal crystals.

In still another embodiment of the magnetic thin film of the present invention, a microcrystal or amorphous grain boundary compound formed of at least one selected from the group consisting of a carbide, a boride, an oxide, a nitride and a metal is preferably present at a grain boundary of the magnetic crystal grains.

According to this preferable embodiment, the grain shape of the magnetic crystal grain is controlled by the grain boundary compound, so that the preferable crystal grain structure of the present invention can be realized and the heat treatment stability of the magnetic property can be improved.

In yet another embodiment of the magnetic thin film of the present invention, an average minimum length T of at least 30% of the boundary compounds preferably satisfies the following inequality:

$$0.1\ \text{nm} < T < 3\ \text{nm} \quad [6]$$

When the average minimum length T of the grain boundary compound is less than 0.1 nm, the crystal grain growth cannot be sufficiently suppressed. On the other hand, when it is more than 3 nm, the exchange coupling between the magnetic crystal grains is prevented, and thus the saturation magnetic flux density is possibly reduced. In particular, it is confirmed that when at least 30% of the grain boundary compounds have an average minimum length T between 0.1 nm and 3 nm, the excellent soft magnetic property and the heat treatment resistant stability can be realized at the same time.

In another embodiment of the magnetic thin film of the present invention, the magnetic thin film comprises an underlying film formed of at least one layer and a magnetic film formed on the underlying film. At least one layer of the underlying film preferably contains an element having a lower free energy for the formation of an oxide and/or a nitride than Fe.

According to this preferable embodiment, the diffusion reaction between the magnetic film and the underlying film is suppressed, and the heat stability in the vicinity of the early formed film having the preferable crystal grain structure can be realized. For example, in the case that the element is in the form of a solid solution, it reacts with an active element such as oxygen, nitrogen, or carbon diffused from the magnetic film or the underlying film, and the thus formed reaction product layer functions as a barrier for preventing diffusion. In the case that the element is present as a stable compound, although the compounds do not form a complete layer, the compounds narrow a diffusion path to prevent the active elements from diffusing, and form reaction products in the vicinity of the diffusion path. As a result, the diffusion reaction is suppressed.

In still another embodiment of the magnetic thin film of the present invention, the magnetic thin film comprises an underlying film formed of at least one layer and a magnetic film formed on the underlying film. At least a layer in contact with the magnetic film among the layers forming the underlying film is preferably formed of a substance having a lower surface free energy than Fe.

For example, in the case that the magnetic film of the present invention is formed by sputtering, crystal grain growth is suppressed especially in an early stage of the growth of the magnetic film, so that the preferable crystal grain structure can be realized starting from the vicinity of the substrate. If the surface free energy is larger than Fe, the crystal grains in the vicinity of the substrate become too large, and thus a magnetism-degraded layer is formed in the vicinity of the substrate. For example, in the case of an MIG head where a magnetic film is formed on ferrite, such a magnetism-degraded layer causes the formation of a pseudo-gap or the degradation of the sensitivity of the head for reproduction. Furthermore, in the case that the magnetic film is divided by insulating layers at relatively small intervals of several ten nm to several $\mu$m, as in the case of an LAM head, the crystallinity of the crystal grains that have been excessively grown in an early stage affects the entire film. Furthermore, since the underlying film can control the free energy accumulated at the interface, the internal stress between the magnetic film and the underlying film or the substrate can be reduced. Accordingly, the degradation of magnetism due to the inverse magnetostriction effect also can be suppressed. A layer formed of a substance having a surface free energy smaller than that of the magnetic film in the underlying film preferably has a thickness of 0.1 nm or more.

In yet another embodiment of the magnetic thin film of the present invention, the magnetic thin film comprises an underlying film formed of at least one layer and a magnetic film formed on the underlying film. At least a layer in contact with the magnetic film among the layers forming the underlying film is preferably formed of a compound of any one selected from the group consisting of a carbide, an oxide, a nitride and a boride of at least one element selected from the group consisting of Al, Ba, Ca, Mg, Si, Ti, V, Zn, Ga and Zr.

According to this preferable embodiment, the reaction between the magnetic film and the underlying film can be suppressed, and the shape of the crystal grains grown in an early stage of the magnetic film can be controlled, so that the preferable crystal grain structure of the magnetic film of the present invention can be realized starting from the vicinity of the film formed in the early stage. In addition, the internal stress can be controlled.

In another embodiment of the magnetic thin film of the present invention, the magnetic thin film comprises an underlying film formed of at least one layer and a magnetic film formed on the underlying film. At least a layer in contact with the magnetic film among the layers forming the underlying film is preferably formed of at least one substance selected from the group consisting of C, Al, Si, Ag, Cu, Cr, Mg, Au, Ga and Zn.

According to this preferable embodiment, the shape of the crystal grains grown in an early stage of the magnetic film can be controlled, so that the preferable crystal grain structure of the magnetic film of the present invention can be realized starting from the vicinity of the film formed in the early stage.

In still another embodiment of the present invention, the magnetic thin film comprises an underlying film formed of at least one layer and a magnetic film formed on the underlying film. The underlying film comprises an underlying layer A in contact with the magnetic film and an underlying layer B in contact with the underlying film A. The underlying layer B is preferably formed of at least one substance selected from the group consisting of Al, Ba, Ca, Mg, Si, T, V, Zn, Ga and Zr. The underlying layer A is preferably formed of a compound of any one selected from the group consisting of a carbide, an oxide, a nitride and a boride of the substance forming the underlying layer B.

According to this preferable embodiment, the reaction between the magnetic film and the underlying film or the substrate can be suppressed, and the shape of the crystal grains grown in an early stage of the magnetic film can be controlled, so that the preferable crystal gain structure of the magnetic film of the present invention can be realized starting from the vicinity of the film formed in the early stage. In addition, the internal stress can be controlled.

In another embodiment of the present invention, the magnetic thin film comprises an underlying film formed of at least one layer and a magnetic film formed on the underlying film. The underlying film comprises an underlying layer A in contact with the magnetic film and an underlying layer B in contact with the underlying film A. The underlying layer A is preferably formed of at least one substance selected from the group consisting of Al, Ba, Ca, Mg, Si, Ti, V, Zn, Ga and Zr. The underlying layer B is preferably formed of a compound of any one selected from the group consisting of a carbide, an oxide, a nitride and a boride of the substance forming the underlying layer A.

According to this preferable embodiment, the reaction between the magnetic film and the underlying film or the substrate can be suppressed, and the shape of the crystal grains grown in an early stage of the magnetic film can be controlled, so that the preferable crystal grain structure of the magnetic film of the present invention can be realized starting from the vicinity of the film formed in the early stage.

In still another embodiment of the present invention, the magnetic thin film comprises an underlying film formed of at least one layer and a magnetic film formed on the underlying film The underlying film comprises an underlying layer A in contact with the magnetic film and an underlying layer B in contact with the underlying film A. The underlying layer A preferably comprises at least one element selected from main component elements contained in the magnetic film and at least one element selected from the group consisting of oxygen and nitrogen, and preferably comprises more oxygen or nitrogen than the magnetic film. The underlying layer B is preferably formed of a compound of any one selected from the group consisting of a carbide, an oxide, a nitride and a boride.

According to this preferable embodiment, the reaction between the magnetic film and the underlying film or the substrate can be suppressed, and the shape of the crystal grains grown in an early stage of the magnetic film can be controlled, so that the preferable crystal grain structure of the magnetic film of the present invention can be realized starting from the vicinity of the film formed in the early stage.

Herein, "main component element" refers to an element that is a component of the magnetic film and that is contained in an amount that allows analysis. More specifically, the element is contained in an amount of at least 0.5 atomic % in the magnetic film.

In yet another embodiment of the present invention, the magnetic thin film comprises an underlying film formed of at least one layer and a magnetic film formed on the underlying film. The underlying film comprises an underlying layer A in contact with the magnetic film and an underlying layer B in contact with the underlying film A. The underlying layer A preferably comprises at least one secondary magnetic layer and at least one parting layer. The secondary magnetic layer and the parting layer are laminated alternately. The underlying layer B is preferably formed of a compound of any one selected from the group consisting of a carbide, an oxide, a nitride and a boride.

According to this preferable embodiment, the crystal grains of the early formed film are made smaller by the parting layer, so that the growth of the crystal grains in an early stage is suppressed, and thus the magnetic film formed thereon can easily have the preferable crystal grain structure of the present invention. Furthermore, the underlying layer B suppresses the reaction between the magnetic film and the substrate or the underlying film. Herein, "parting layer" can be any layer, as long as it comprises a metal that has a different composition from the magnetic film and the secondary magnetic film, which can be a layer composed of an alloy, a carbide, an oxide, a nitride, a boride or the like.

In the case that the magnetic thin film comprises a parting layer, the parting layer preferably comprises at least one element common to the magnetic film, and more oxygen or nitrogen than the magnetic film. According to this preferable embodiment, the parting layer has a common component to the magnetic film, so that the diffusion at the interface can be suppressed, and thus heat treatment resistance of the magnetic property becomes high.

In still another embodiment of the magnetic thin film of the present invention, a thickness of the secondary magnetic layer $t_M$ and a thickness of the parting layer $t_S$ preferably satisfy the following inequalities:

$$0.5\ \text{nm} \leq t_M \leq 100\ \text{nm} \quad [7]$$

$$0.05\ \text{nm} \leq t_S \leq 10\ \text{nm} \quad [8]$$

According to this preferable embodiment, since the growth of the crystal grains in an early stage can be suppressed effectively, the magnetic film formed thereon can easily have the preferable crystal grain structure of the present invention.

It is preferable that the total thickness of the secondary magnetic layer and the parting layer be 300 nm or less. When the thickness $t_M$ is less than 0.5 nm, or more than 100 nm, the magnetic property of the laminated underlying film is degraded. When the thickness $t_M$ is less than 30 nm, the internal stress in the vicinity of the early formed film decreases, and thus the stress between the substrate and the magnetic thin film can be reduced. On the other hand, when the thickness of the parting layer is less than 0.05 nm, the advantageous effect is difficult to obtain. A thickness more than 10 nm is not preferable either, because the magnetic coupling between the underlying film and the main magnetic film is weakened.

In yet another embodiment of the present invention, the magnetic thin film comprises a substrate, an underlying film formed of at least one layer formed on the substrate and a magnetic film formed on the underlying film. Among the underlying films, at least a layer in contact with the substrate is preferably a fine-structure magnetic layer comprising a magnetic amorphous body or magnetic crystal grains whose average grain diameter d satisfies the following inequality as a mother phase:

$$d \leqq 20 \text{ nm} \quad [9]$$

A thin film material formed by sputtering generally has internal stress immediately after the film was formed, and peeling of a film, or substrate breakage occurs depending on the value of the internal stress, the adhesive strength between the substrate and the film, the thickness of the film, a breaking strength of the substrate or the like. The main cause is the internal stress of the film. However, the conditions for obtaining a high performance film usually are different from those for making the internal stress lowest. The inventors performed various researches in order to obtain the conditions that allow less peeling of a film and substrate breakage caused by the internal stress. As a result, the inventors proposed the following mechanism and verified it, until they discovered the aspects of the invention as discussed above.

In other words, although the roughness of a surface of a substrate where a film is to be formed is in the range between about several nm and several hundreds nm (e.g., between 3 nm and 800 nm), actually, other traces marked by polishing having sharp edges on the atomic order are left on the surface of the substrate. In general, in the case that a film is formed on a substrate by sputtering, an island structure is produced on the substrate in an early stage of the film formation, and a groove as described above is present in the gap between the island-like crystals. One of the factors causing peeling of a film is the presence of the gap formed by such a groove portion at the interface between the surface of the substrate and the film. In the case that the film has internal stress, the internal stress concentrates in the groove, and thus substrate breakage is likely to occur starting from the sharp edged groove. Therefore, one solution is to eliminate the grooves from the surface of the substrate. Another solution is to fill up the sharp edged grooves.

In view of the above-described points, the peeling of the film and the substrate breakage can be suppressed by using a magnetic amorphous body as a mother phase, or forming an underlying layer including small crystal grains with an average diameter of 20 nm or less under the thin film. When the average grain diameter is more than 20 nm, this effect disappears gradually as it becomes larger.

As described above, the peeling of a film and the substrate breakage are problems common to thin film materials. For a magnetic material, after a film is formed, it is necessary to be subjected to a heat treatment at a temperature several hundreds degrees higher than a temperature for forming the film and to reduce the internal stress including heat stress of the substrate and the film to about zero in the heated state. The relaxation of the internal stress of the film by the heat treatment makes a significant difference in the internal stress of the film between immediately after the film formation and after the heat treatment. Therefore, especially in the magnetic thin film material among thin film materials, the peeling of a film or the substrate breakage is likely to occur even if the film thickness is as small as several μm. Therefore, the formation of the underlying layer comprising smaller crystal grains in the range of the present invention provides great significance and effects.

Furthermore, when the fine-structure layer formed between ferrite and a magnetic film is non-magnetic, especially for an MIG head, a pseudo-gap is formed. Therefore, the fine-structure layer is preferably formed of a magnetic material.

In another embodiment of the magnetic thin film of the present invention, a thickness of the fine-structure magnetic layer $t_r$ and a thickness of the magnetic film $t_f$ preferably satisfy the following inequality:

$$10 \text{ nm} < t_r < t_f/3 \quad [10]$$

When the thickness of the fine-structure magnetic layer is 10 nm or less, the substrate breakage cannot be sufficiently suppressed. This is supposedly because the roughness on the surface of the substrate cannot be filled up sufficiently. Furthermore, the characteristics of the main magnetic film can hardly be effective sufficiently, when the thickness of the fine-structure magnetic layer is about ⅓ or more of the magnetic film. The maximum of the thickness of the fine-structure magnetic layer $t_r$ is preferably about 300 nm, and such thickness easily can provide the suppression of the substrate breakage and the magnetic property at the same time.

In still another embodiment of the magnetic thin film of the present invention, the fine-structure layer preferably comprises at least one element common to the magnetic film.

According to this preferable embodiment, the fine-structure magnetic layer and the magnetic film has a common element, so that the electrochemical potentials of the fine-structure magnetic layer and the magnetic film are close to each other, and thus corrosion due to the effect of local cell between the films of different types is suppressed. In addition, in the case that the fine-structure magnetic layer and the magnetic film are formed successively, appropriate mutual diffusion of the respective films suppresses the peeling between the films of different types.

In yet another embodiment of the magnetic thin film of the present invention, the common element preferably comprises an element having a lowest free energy for the formation of an oxide and/or a nitride among elements contained in the fine-structure magnetic layer or the magnetic film.

According to this preferable embodiment, the corrosion between the fine-structure magnetic layer and the magnetic film is further suppressed. Furthermore, according to a more preferable embodiment where the fine-structure magnetic layer and the magnetic film are formed successively, the formation of a magnetism-degraded layer caused by excessive mutual diffusion between the layers can be suppressed.

In another embodiment of the magnetic thin film of the present invention, the common element is preferably at least one element selected from the group consisting of oxygen, nitrogen, carbon and boron. The addition of these elements can easily realize the preferable structures of the crystal grains of the magnetic film and the fine-structure magnetic layer.

In still another embodiment of the magnetic thin film of the present invention, the fine-structure magnetic layer preferably comprises at least one element selected from the group consisting of elements of Group IIIa, Group IVa, and Group Va. The elements belonging to Group IIIa, Group IVa, and Group Va have lower free energies for the formation of an oxide or a nitride than Fe, and they are thus excellent in corrosion resistance. It is easy to allow Co and Fe to have smaller crystal grains by controlling the amount of these elements added, and thus the fine-structure magnetic layer can be formed easily.

In yet another embodiment of the present invention, the magnetic thin film comprises an underlying film formed of at least one layer and a magnetic film formed on the underlying film. The underlying film comprises an underlying layer A in contact with the magnetic film and an underlying layer B in contact with the underlying layer A. A concentration $C_1$ (atomic %) of an element group consisting of oxygen, nitrogen, carbon and boron in the magnetic film, a concentration $C_2$ (atomic %) of an element group consisting of oxygen, nitrogen, carbon and boron in the underlying layer A, and a concentration $C_3$ (atomic %) of an element group consisting of oxygen, nitrogen, carbon and boron in the underlying layer B preferably satisfy the following inequality:

$$0 \leqq C_1 \leqq C_3 \leqq C_2 \quad [11]$$

According to this preferable embodiment, at least one of the underlying layers A and B serves as the fine-structure magnetic layer. Especially, the underlying layer B closer to the substrate predominately works as such. The underlying layer A in contact with the magnetic film contains a large amount of at least one element selected from the group consisting of oxygen, nitrogen, carbon, and boron, and comprises smaller crystal grains, so that the underlying layer A not only works as the fine-structure magnetic layer, but also provides the effect of suppressing the growth of crystal grains in an early stage of the magnetic film, and thus improves the magnetic property of the magnetic thin film as a whole.

In another embodiment of the present invention, the magnetic thin film comprises an underlying film formed of at least one layer and a magnetic film formed on the underlying film. The underlying film comprises an underlying layer A in contact with the magnetic film and an underlying layer B in contact with the underlying layer A. A concentration $C_1$ (atomic %) of an element group consisting of oxygen, nitrogen, carbon and boron in the magnetic film, a concentration $C_2$ (atomic %) of an element group consisting of oxygen, nitrogen, carbon and boron in the underlying layer A, and a concentration $C_3$ (atomic %) of an element group consisting of oxygen, nitrogen, carbon and boron in the underlying layer B preferably satisfy the following inequality:

$$0 \leqq C_1 \leqq C_2 \leqq C_3 \quad [12]$$

According to this preferable embodiment, at least one of the underlying layers A and B serves as the fine-structure magnetic layer. Especially, the underlying layer B closer to the substrate predominately works as such. The underlying layer A in contact with the magnetic film contains a larger amount of at least one element selected from the group consisting of oxygen, nitrogen, carbon, and boron, so that the underlying layer A suppresses the growth of crystal grains in an early stage of the magnetic film, which tend to be excessively grown, and thus improves the magnetic property of the magnetic thin film as a whole.

In still another embodiment of the magnetic thin film of the present invention, it is preferable that the element group concentrations $C_1$ and $C_3$ are different from each other, and the element group concentration $C_2$ substantially continuously changes in a thickness direction so as to reduce a concentration difference at an interface between the layers.

According to this preferable embodiment, the content of at least one element selected from the group consisting of oxygen, nitrogen, carbon, and boron, is changed continuously in the underlying layer A, so that the formation of a magnetism-degraded layer caused by excessive mutual diffusion between the layers can be suppressed. Moreover, since the shape and the size of the crystal grains are changed continuously, the magnetic continuity from the underlying layer B to the magnetic film is improved and thus the soft magnetic property is improved.

In yet another embodiment of the present invention, the magnetic thin film is preferably formed on a substrate with convexities or and concavities.

In some cases, for example, as a process for producing an MIG head, a film is to be formed at an interval of several μm to several hundreds μm (e.g., 5 μm to 500 μm) in a direction parallel to a substrate on the substrate with convexities and concavities of several μm to several mm (e.g., 1 μm to 3 mm) in a direction vertical to the substrate. In this case, since an area to which the film adheres per unit volume of the substrate increases, the total stress of the film increases in the vicinity of the substrate. Consequently, the probability of the peeling of the film and the substrate crack increases. Therefore, in the case that the substrate has convexities and concavities, the formation of the underlying layer having a fine structure suppresses the peeling of the film and the cracking of the substrate.

In another embodiment of the present invention, the magnetic thin film is preferably formed on a high resistance substrate or a high resistance material.

When the resistivity of the substrate or the material is about several ten μΩ cm or less, a local cell is formed between the substrate and the magnetic film, the underlying layer or the magnetic thin film, and thus corrosion is likely to occur. The resistivity of the substrate on which the underlying layer or the magnetic film is formed or the material with which the underlying layer or the magnetic film is formed is preferably several hundreds μΩ cm or more (e.g., 200 μΩ cm or more).

In another embodiment of the present invention, the magnetic thin film is preferably formed on a substrate provided with a barrier layer. The barrier layer is formed of an oxide or a nitride of at least one element selected from the group consisting of Al, Si, Cr and Zr, and has a thickness du satisfying the following inequality:

$$0.5\ \text{nm} < du < 10\ \text{nm} \quad [13]$$

An oxide or a nitride of at least one element selected from the group consisting of Al, Si, Cr, and Zr, which are high resistive, is formed on a substrate, so that even if the substrate has a high resistivity, the corrosion due to the local cell between the substrate and the underlying film or the magnetic film is suppressed. In addition, during a heat treatment, the diffusion reaction between the substrate and the underlying film or the magnetic film can be suppressed. A thickness of the barrier film of more than 0.5 nm provides the above advantageous effect, but a thickness of 10 nm or more is not preferable because it causes a pseudo-gap, for example when an MIG head is formed therefrom.

According to another aspect of the present invention, a magnetic thin film comprises a magnetic film having a composition expressed by $(M_aX^1{}_bZ^1{}_c)_{100-d}A_d$, where M is at least one magnetic metal element selected from the group consisting of Fe, Co and Ni, $X^1$ is at least one element selected from the group consisting of Si, Al, Ga and Ge, $Z^1$ is at least one element selected from the group consisting of elements of Group IVa, Group Va and Cr, A is at least one element selected from the group consisting of O and N, and a, b, c and d are values satisfying the following inequalities:

$$0.1 \leq b \leq 26$$

$$0.1 \leq c \leq 5$$

$$a+b+c=100$$

$$1 \leq d \leq 10$$

Preferably, M is mainly composed of Fe. Generally, $X^1$ partially exists in crystals in the form of a solid solution so as to improve corrosion resistance, and controls the shape of crystal grains in a diffusion process in the crystals and further in a process of a reaction with A. When the amount of $X^1$ added exceeds 26 atomic %, the saturation magnetic flux density becomes too low. On the other hand, an amount less than 0.1 atomic % is not effective. Furthermore, $Z^1$ serves to make a magnetostriction positive, and improves corrosion resistance and controls the shape of the crystal grains along with the element $X^1$. Although an amount of $Z^1$ of 0.1 atomic % or more provides the advantageous effect, an amount more than 5 atomic % not only degrades the saturation magnetic flux density, but also allows an amorphous state to prevail immediately after the film formation, for example in the case that the film is formed by sputtering. This may make it difficult to form the preferable crystal grain structure of the present invention. Although the elements $X^1$ and $Z^1$ basically have similar functions in terms of corrosion resistance and the control of the crystal grain shape, they have different diffusion rates, different free energies for the formation of an oxide or a nitride, and different sizes of the critical nuclei for reaction products. Therefore, for example, in the case that the magnetic thin film of the present invention is formed by sputtering, a reaction process including a plurality of intermediate reactions works over a period from immediately after the film formation through a heat treatment. The magnetic thin film of the present invention has a higher heat treatment stability than a magnetic thin film whose forming process comprises a single reaction process, even if the amount of the elements added is small. Furthermore, A in the range between 1 atomic % and 10 atomic % forms the preferable crystal grain structure of the present invention. However, an amount more than 10 atomic % causes the prevalence of an amorphous state immediately after the film formation, the degradation of corrosion due to the reaction with a preferable amount of elements $X^1$ and $Z^1$ that exist in the crystal grains in the form of a solid solution, the degradation of the magnetic property, and further the degradation of the soft magnetic property due to an increase of the amount of the element A that exists the crystal grains in the form of a solid solution. Preferably, this magnetic film is suitably combined with the underlying layer, the barrier layer or the substrate so as to form a magnetic thin film.

According to another aspect of the present invention, a magnetic thin film comprises a magnetic film having a composition expressed by $(M_aX^2{}_bZ^2{}_c)_{100-d}A_d$, where M is at least one magnetic metal element selected from the group consisting of Fe, Co and Ni, $X^2$ is at least one element selected from the group consisting of Si, and Ge, $Z^2$ is at least one element selected from the group consisting of elements of Group IVa, Group Va, Al, Ga and Cr. A is at least one element selected from the group consisting of O and N, and a, b, c and d are values satisfying the following inequalities:

$$0.1 \leq b \leq 23$$

$$0.1 \leq c \leq 8$$

$$a+b+c=100$$

$$1 \leq d \leq 10$$

Preferably, M is mainly composed of Fe. Generally, $X^2$ partially exists in crystals in the form of a solid solution and serves to adjust a magnetostriction to be positive or negative. In addition, $X^2$ not only reduces crystal magnetic anisotropy of magnetic crystals, but also improves corrosion resistance, and controls the shape of crystal grains in a diffusion process in the crystals and further in a process of a reaction with A. When the amount of $X^2$added exceeds 23 atomic %, the saturation magnetic flux density becomes too low. On the other hand, an amount less than 0.1 atomic % is not effective. Furthermore, $Z^2$ serves to make a magnetostriction positive, and improves corrosion resistance and controls the shape of the crystal grains along with the element $X^2$. Although an amount of $Z^2$of 0.1 atomic % or more provides the advantageous effect, an amount more than 8 atomic % not only degrades the saturation magnetic flux density, but also allows an amorphous state to prevail immediately after the film formation, for example in the case that the film is formed by sputtering. This may make it difficult to form the preferable crystal grain structure of the present invention. Although the elements $X^2$ and $Z^2$ basically have similar functions in terms of corrosion resistance and the control of the crystal grain shape, they have different diffusion rates, different free energies for the formation of an oxide or a nitride, and different sizes of the critical nuclei for reaction products. Therefore, for example, in the case that the magnetic thin film of the present invention is formed by sputtering, a reaction process including a plurality of intermediate reactions works over a period immediately after the film formation through a heat treatment. The magnetic thin film of the present invention has a higher heat treatment stability than a magnetic thin film whose forming process comprises a single reaction process, even if the amount of the elements added is small. Furthermore, A in the range between 1 atomic % and 10 atomic % forms the preferable crystal grain structure of the present invention. However, an amount more than 10 atomic % causes the prevalence of an amorphous state immediately after the film formation, the degradation of corrosion due to the reaction with a preferable amount of elements $X^2$ and $Z^2$ that exist in the crystal grains in the form of a solid solution, the degradation of the magnetic property, and further the degradation of the soft magnetic property due to an increase of the amount of the element A that exists in the crystal grains in the form of a solid solution. Preferably, this magnetic film is suitably combined with the underlying layer, the barrier layer or the substrate so as to form a magnetic thin film.

According to another aspect of the present invention, a magnetic thin film comprises a magnetic film having a composition expressed by $(Fe_aSi_bAl_cT_d)_{100-e}N_e$, where T is at least one element selected from the group consisting of Ti and Ta, and a, b, c, d and e are values satisfying the following inequalities:

$$10 \leq b \leq 23$$

$$0.1 \leq d \leq 5$$

$$0.1 \leq c+d \leq 8$$

$$a+b+c+d=100$$

$$1 \leq e \leq 10$$

In this case, it is believed that the magnetic crystal grain having a shape whose surface area per volume is large such as a columnar, needle, or branched crystal grain is mainly formed of FeSi, and a reaction product having a small free energy for the formation of a nitride such as Al—N, Ta(Ti)—N, Si—N or the like is formed on the crystal grain boundary.

It is known that in the case that Si forms a solid solution with Fe, Si can reduce crystal magnetic anisotropy by forming a b2 or Do3 structure. In the present invention, the results of analysis of the structure with X-rays did not confirm such diffraction lines. However, in the case that the amount of Si is changed in the above-described range, while the amounts of other elements are fixed, it was confirmed that the magnetostriction changed from positive to negative. Therefore, it is inferred that although the FeSi alloy that mainly forms the magnetic crystal grains of the present invention has low order parameters, it reduces the crystal magnetic anisotropy slightly. For the content of Si in the above-described range, when T(Ta,Ti) is less than 0.1 atomic %, the corrosion resistance and the magnetic property are improved, but the heat stability is not sufficiently improved. A content more than 5 atomic % reduces the saturation magnetic flux density. A total content of Al and T exceeding 8 atomic % is not preferable, because the saturation magnetic flux density is reduced and the magnetostriction constant is raised. Preferably, this magnetic film is suitably combined with the underlying layer, the barrier layer or the substrate so as to form a magnetic thin film.

According to another aspect of the present invention, a magnetic thin film comprises a magnetic film having a composition expressed by $(Fe_aSi_bAl_cTi_d)_{100-e-f}N_eO_f$, wherein a, b, c, d, e and f are values satisfying the following inequalities:

$$10 \leq b \leq 23$$

$$0.1 \leq d \leq 5$$

$$0.1 \leq c+d \leq 8$$

$$a+b+c+d=100$$

$$1 \leq e+f \leq 10$$

$$0.1 \leq f \leq 5$$

In this case, it is believed that the magnetic crystal grain having a shape whose surface area per volume is large such as a columnar, needle, or branched crystal grain is mainly formed of FeSi, and a reaction product having a small free energy for the formation of a nitride such as Al—N, Al—O, Ti—N, Ti—O, Si—N, Si—O or the like is formed on the crystal grain boundary. For the content of Si in the above-described range, when Ti is less than 0.1 atomic %, the corrosion resistance and the magnetic property are improved, but the heat stability is not sufficiently improved. A content more than 5 atomic % reduces the saturation magnetic flux density. A total content of Al and Ti exceeding 8 atomic % is not preferable, because the saturation magnetic flux density is reduced and the magnetostriction constant is raised. N is an element that is effective alone, but further improves the magnetic property, especially by adding together with O. This is thought to be due to an effect caused by the increase of reaction products. Furthermore, when the amount of O added is less than 0.1 atomic %, the effect is not distinct. On the other hand, the addition of an amount more than 5 atomic % causes the degradation of the saturation magnetic flux density, the increase of the magnetostrictive constant or the like. Preferably, this magnetic film is suitably combined with the underlying layer, the barrier layer or the substrate so as to form a magnetic thin film.

The magnetic thin film has a high saturation magnetic flux density and a high magnetic permeability, and an excellent heat treatment resistant stability and corrosion resistance, so that it can be applied to a variety of magnetic devices. In particular, it is preferable to use the magnetic thin film of the present invention for a magnetic head that requires an ability of recording to a high-coercive force medium, a high regenerating sensibility and a high resistance against surroundings.

These and other advantages of the present invention will become apparent to those skilled in the art upon reading and understanding the following detailed description with reference to the accompanying figures.

DESCRIPTION OF THE PREFERRED EMBODIMENTS

Figure 1:
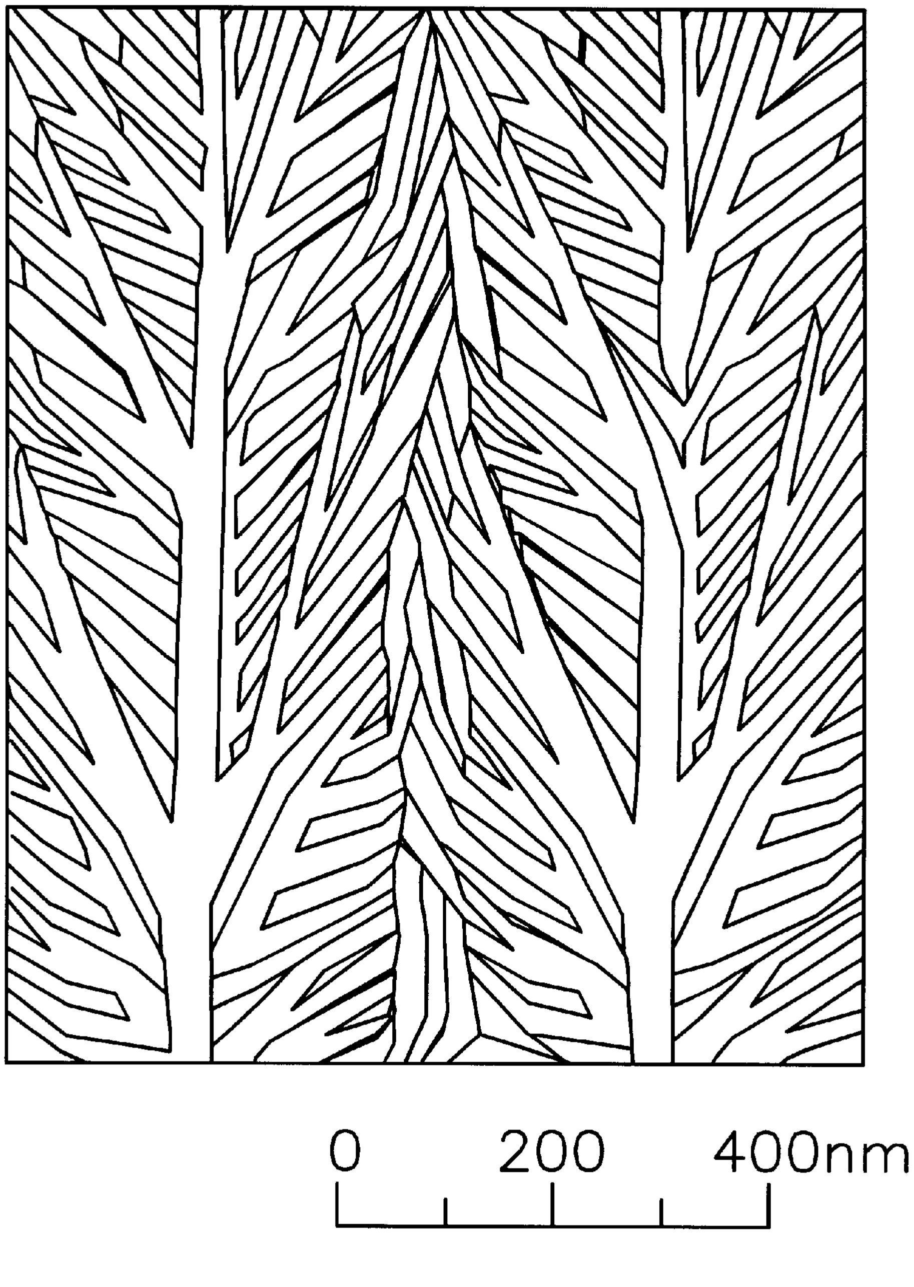
FIG. 1 is a schematic view in the direction of the growth of a magnetic film having branched crystal grains (an underlying film and a substrate are not shown).

A magnetic thin film having the structure and the composition of the present invention can be formed in a low gas pressure atmosphere by sputtering typified by high frequency magnetron sputtering, direct current sputtering, opposed-target sputtering, ion beam sputtering, and ECR sputtering. More specifically, a film is formed on a substrate by the following methods: an alloy target whose composition is determined in view of a difference from the composition of the magnetic film of the present invention is sputtered in an inert gas; element pellets to be added are placed on a metal target and sputtered simultaneously; or a part of an additive is introduced in the form of gas to an apparatus and reactive sputtering is performed. In this forming process, the structure and the coefficient of thermal expansion of the magnetic thin film, and the characteristics of the film determined by the positions of the substrate and the target, can be controlled by changing discharge gas pressure, discharge electric power, the temperature of the substrate, the bias state of the substrate, the magnetic field values on the target and in the vicinity of the substrate, the shape of the target, the direction of particles introduced into the substrate, or the like.

Furthermore, a magnetic thin film can be formed by evaporation typified by heat evaporation, ion plating, cluster ion beam evaporation, reactive evaporation, EB evaporation, MBE or a super quenching technique.

Regarding a substrate to be used, in the case that the magnetic thin film of the present invention is formed into a MIG head, a ferrite substrate is preferably used. In the case that it is formed into a LAM head, a non-magnetic insulating substrate is preferably used. In both cases, an underlying film or a barrier layer may be previously formed on the substrate for the purpose of preventing the reaction between the substrate and the magnetic film or controlling the crystal state.

In the case that the magnetic film is used as a magnetic head, head processing is performed so as to obtain the intended shape of the magnetic head. The magnetic property of the magnetic film is measured after having been subjected to a heat treatment of the head processing. All the magnetic films having the composition described in the following examples exhibit the soft magnetic property immediately after the film is formed by controlling the film-forming process, and thus the magnetic thin film of the present invention can be used for a thin film head that requires a low temperature forming process.

EXAMPLES

In the examples described below, the structure of the film was analyzed with X-ray diffraction (XRD), a transmission electron microscope (TEM), and a high resolution scanning electron microscope (HR-SEM). "Magnetic crystal grain" described in the examples refers to a continuous crystal region that is believed to have a substantially uniform crystal orientation crystallographically by the comparison of a bright image and a dark image of the TEM. The analysis of the composition is evaluated by EPMA and RBS (Rutherford backscattering). In particular, the analysis of the composition in a micro region is evaluated by EDS annexed to the TEM, the coercive force is evaluated by a BH loop tracer, the saturation magnetic flux density is evaluated by VSM, and corrosion resistance is evaluated according to a salt-spraying test of an environment test of JIS (Japanese Industrial Standard) C0024, or by immersing a sample in pure water. Hereinafter, the present invention will be described in detail by way of examples.

Example 1

In Example 1, compositions and film structures such as a crystal shape were investigated on a magnetic film formed by RF magnetron sputtering under various sputtering conditions such as discharge gas pressure and substrate temperatures with different added elements at different reactant gas flow rates. The results are shown in Tables 1 to 3. As shown in a schematic cross-sectional view through a TEM of FIG. 2, the section of the film had a structure where approximate needle or columnar magnetic crystal grains were grown substantially perpendicular to the surface of a substrate.

The crystal shape was evaluated with respect to an average size dL in a longitudinal direction of the crystal grain and an average size dS in a short direction of the crystal grain. The size in the longitudinal direction was estimated by observation of a broken-out section parallel to the grain growth of the film through a SEM or observation through TEM after ion-milling of a polished face. Since it is difficult to observe a cross-section of the film perfectly parallel to the grain growth direction, the actual size dL might be longer than the values shown in Tables. However, values obtained by the observation of a section of the film substantially parallel to the grain growth direction are used to obtain the average size dL. An average value of a group of crystal grains having the broadest width in the area where the cross-section is observed is chosen as the average of the size dS in the short direction, in view of the shape of the crystal grain and the difficulty in observing a perfectly parallel cross-section as in the case of the size dL. The film thicknesses of the following samples were 3 μm, and the magnetic property was obtained after heat treatment under a vacuum at 520° C.

The film-forming conditions in Example 1 are as follows:

Conditions for Examples aa to az, ba to bz

Substrate: non-magnetic ceramic substrate

Substrate temperature: room temperature

Magnetic film target: a complex target where an element or compound chip is placed on a Fe target Target size: 3 inch Discharge gas pressure: 1 to 4 mTorr Main sputtering gas: Ar Nitrogen flow ratio: 2 to 4%

Oxygen flow ratio: 0.5 to 2%

Discharge power: 400 W

Experiments for Comparative Examples are made by changing the conditions for the above example to the following conditions.

Conditions for Comparative Examples ca to cc

Substrate temperature: from room temperature to 300° C.

Conditions for Comparative Examples cd to cf

Discharge gas pressure: from 1 to 4 mTorr to 8 to 12 mTorr

Conditions for Comparative Examples cg to ch

Nitrogen flow ratio: from 2 to 4% to 5 to 7%

Oxygen flow ratio: from 0.5 to 2% to 2 to 7%

TABLE 1

| Example | Film Composition (atom %) | Coercive Force (Oe) | dS (nm) | dL (nm) |
|---|---|---|---|---|
| aa | $(Fe_{98}Ti_1Ta_1)_{93}O_2N_5$ | 0.7 | 19 | 320 |
| ab | $(Fe_{98}Ti_1Hf_1)_{93}O_2N_5$ | 0.6 | 17 | 320 |
| ac | $(Fe_{98}Ti_1Zr_1)_{93}O_2N_5$ | 0.9 | 21 | 250 |
| ad | $(Fe_{98}Ti_1V_1)_{93}O_2N_5$ | 0.6 | 19 | 300 |
| ae | $(Fe_{98}Ti_1Cr_1)_{93}O_2N_5$ | 0.9 | 22 | 250 |
| af | $(Fe_{98}Ti_1Al_1)_{93}O_2N_5$ | 0.8 | 20 | 260 |
| ag | $(Fe_{98}Ga_1Ti_1)_{93}O_2N_5$ | 0.8 | 19 | 280 |
| ah | $(Fe_{98}Ga_1Zr_1)_{93}O_2N_5$ | 0.8 | 20 | 300 |
| ai | $(Fe_{98}Ga_1Hf_1)_{93}O_2N_5$ | 0.7 | 17 | 250 |
| aj | $(Fe_{98}Ga_1Ta_1)_{93}O_2N_5$ | 0.7 | 18 | 300 |
| ak | $(Fe_{98}Ga_1V_1)_{93}O_2N_5$ | 0.7 | 18 | 350 |
| al | $(Fe_{98}Al_1Ti_{0.5}Nb_{0.5})_{93}O_2N_5$ | 0.6 | 17 | 280 |
| am | $(Fe_{98}Al_1Ti_{0.5}Ta_{0.5})_{93}O_2N_5$ | 0.6 | 15 | 300 |
| an | $(Fe_{98}Al_1Ti_{0.5}V_{0.5})_{93}O_2N_5$ | 0.6 | 15 | 250 |
| ao | $(Fe_{98}Al_1V_{0.5}Ta_{0.5})_{93}O_2N_5$ | 0.5 | 15 | 300 |
| ap | $(Fe_{98}Al_1V_{0.5}Hf_{0.5})_{93}O_2N_5$ | 0.6 | 17 | 280 |
| aq | $(Fe_{98}Si_1Ti_{0.5}Nb_{0.5})_{93}O_2N_5$ | 0.6 | 16 | 310 |
| ar | $(Fe_{98}Si_1Ti_{0.5}Ta_{0.5})_{93}O_2N_5$ | 0.6 | 18 | 280 |
| as | $(Fe_{98}Si_1Ti_{0.5}V_{0.5})_{93}O_2N_5$ | 0.6 | 18 | 330 |
| at | $(Fe_{98}Si_1Al_{0.5}Ti_{0.5})_{93}O_2N_5$ | 0.7 | 17 | 250 |
| au | $(Fe_{98}Si_1Al_{0.5}Ta_{0.5})_{93}O_2N_5$ | 0.6 | 15 | 300 |
| av | $(Fe_{98}Si_1Al_{0.5}Hf_{0.5})_{93}O_2N_5$ | 0.6 | 16 | 250 |
| aw | $(Fe_{98}Si_1Al_{0.5}V_{0.5})_{93}O_2N_5$ | 0.7 | 18 | 280 |
| ax | $(Fe_{98}Si_1Al_{0.5}Zr_{0.5})_{93}O_2N_5$ | 0.8 | 18 | 340 |
| ay | $(Fe_{98}Ge_1Al_{0.5}Nb_{0.5})_{93}O_2N_5$ | 0.7 | 19 | 240 |
| az | $(Fe_{98}Ge_1Al_{0.5}Ta_{0.5})_{93}O_2N_5$ | 0.7 | 20 | 280 |

TABLE 2

| Example | Film Composition (atom %) | Coercive Force (Oe) | dS (nm) | dL (nm) |
|---|---|---|---|---|
| ba | $(Fe_{98}Ti_1Ta_1)_{92}N_8$ | 0.8 | 19 | 350 |
| bb | $(Fe_{98}Ti_1Hf_1)_{92}N_8$ | 0.8 | 18 | 300 |
| bc | $(Fe_{98}Ti_1Zr_1)_{92}N_8$ | 0.9 | 21 | 270 |
| bd | $(Fe_{98}Ti_1V_1)_{92}N_8$ | 0.7 | 18 | 380 |
| be | $(Fe_{98}Ti_1Cr_1)_{92}N_8$ | 0.9 | 22 | 250 |
| bf | $(Fe_{98}Ti_1Al_1)_{92}N_8$ | 0.9 | 21 | 350 |
| bg | $(Fe_{98}Ga_1Ti_1)_{92}N_8$ | 0.9 | 20 | 340 |
| bh | $(Fe_{98}Ga_1Zr_1)_{92}N_8$ | 0.9 | 20 | 320 |
| bi | $(Fe_{98}Ga_1Hf_1)_{92}N_8$ | 0.8 | 18 | 350 |
| bj | $(Fe_{98}Ga_1Ta_1)_{92}N_8$ | 0.7 | 18 | 280 |
| bk | $(Fe_{98}Ga_1V_1)_{92}N_8$ | 0.9 | 18 | 250 |
| bl | $(Fe_{98}Al_1Ti_{0.5}Nb_{0.5})_{92}N_8$ | 0.7 | 17 | 380 |
| bm | $(Fe_{98}Al_1Ti_{0.5}Ta_{0.5})_{92}N_8$ | 0.6 | 15 | 320 |
| bn | $(Fe_{98}Al_1Ti_{0.5}V_{0.5})_{92}N_8$ | 0.7 | 17 | 290 |
| bo | $(Fe_{98}Al_1V_{0.5}Ta_{0.5})_{92}N_8$ | 0.6 | 15 | 270 |
| bp | $(Fe_{98}Al_1V_{0.5}Hf_{0.5})_{92}N_8$ | 0.6 | 18 | 340 |
| bq | $(Fe_{98}Si_1Ti_{0.5}Nb_{0.5})_{92}N_8$ | 0.7 | 19 | 300 |
| br | $(Fe_{98}Si_1Ti_{0.5}Ta_{0.5})_{92}N_8$ | 0.6 | 17 | 270 |
| bs | $(Fe_{98}Si_1Ti_{0.5}V_{0.5})_{92}N_8$ | 0.8 | 19 | 410 |
| bt | $(Fe_{98}Si_1Al_{0.5}Ti_{0.5})_{92}N_8$ | 0.9 | 17 | 390 |
| bu | $(Fe_{98}Si_1Al_{0.5}Ta_{0.5})_{92}N_8$ | 0.7 | 15 | 350 |
| bv | $(Fe_{98}Si_1Al_{0.5}Hf_{0.5})_{92}N_8$ | 0.6 | 16 | 310 |
| bw | $(Fe_{98}Si_1Al_{0.5}V_{0.5})_{92}N_8$ | 0.7 | 18 | 270 |
| bx | $(Fe_{98}Si_1Al_{0.5}Zr_{0.5})_{92}N_8$ | 0.8 | 18 | 380 |
| by | $(Fe_{98}Ge_1Al_{0.5}Nb_{0.5})_{92}N_8$ | 0.7 | 19 | 300 |
| bz | $(Fe_{98}Ge_1Al_{0.5}Ta_{0.5})_{92}N_8$ | 0.7 | 20 | 290 |

TABLE 3

| Comp. Example | Film Composition (atom %) | Coercive Force (Oe) | dS (nm) | dL (nm) |
|---|---|---|---|---|
| ca | $(Fe_{98}Ti_1Ta_1)_{93}O_2N_5$ | 2.5 | 250 | 1320 |
| cb | $(Fe_{98}Ti_1Hf_1)_{93}O_2N_5$ | 3.4 | 230 | 1820 |
| cc | $(Fe_{98}Ti_1Zr_1)_{93}O_2N_5$ | 3.9 | 200 | 1950 |
| cd | $(Fe_{98}Ti_1V_1)_{93}O_2N_5$ | 4.6 | 65 | 800 |
| ce | $(Fe_{98}Ti_1Cr_1)_{93}O_2N_5$ | 4.9 | 60 | 550 |
| cf | $(Fe_{98}Ti_1Al_1)_{93}O_2N_5$ | 3.8 | 80 | 600 |
| cg | $(Fe_{98}Ga_1Ti_1)_{80}O_{10}N_{10}$ | 8.8 | 5 | 5 |
| ch | $(Fe_{98}Ga_1Zr_1)_{80}O_{10}N_{10}$ | 10.8 | 5 | 5 |

In the case that O and N in the above examples were partially or totally substituted with B and C, the magnetic property and the crystal structure resulted in substantially the same correlation as above.

Furthermore, in the samples in Example 1, any crystal orientations of adjacent magnetic crystal grains were random in the inplane direction.

Furthermore, when the magnetic film of Example 1 was produced by DC magnetron sputtering, the resulting composition and crystal structure were substantially the same as above by changing the discharge gas pressure to 0.5 to 2 mTorr, and the power to 100 W. Moreover, it was confirmed that the magnetic film exhibited an excellent soft magnetic property immediately after the film is formed.

When the film structure was observed on a face parallel to the surface of the substrate for all the samples of the above examples, it was confirmed that the magnetic film comprised transformed circles, transformed ellipses or the combination of these shapes, and that the average surface area Sa and the average volume Va of the magnetic crystal grain sufficiently satisfied the following relationship: $Sa>4.84\ Va^{2/3}$.

When the samples of Examples and Comparative Examples were immersed in pure water for 6 hours, the samples of Comparative Examples ca to cf corroded to such an extent that the surface of the substrate was exposed. On the other hand, the samples of Examples did not completely corrode, although some corrosion was seen. The samples of Comparative Examples cg and ch had the most satisfactory corrosion resistance, but the saturation magnetic flux densities thereof were significantly lowest in all the samples.

Example 2

In Example 2, the relationship between sputtering conditions such as discharge gas pressure, substrate temperatures, target shapes and directions of introduced particles, and film structures such as crystal shapes and magnetic properties was investigated on a magnetic film formed by RF magnetron sputtering. The results are shown in Tables 4 and 5.

When evaluating the crystal shape, for the magnetic crystal grain that has approximately columnar or needle shape, the average size in the longitudinal direction of the crystal grain is represented by dL, and the average size in the short direction of the crystal grain is represented by dS. For the magnetic crystal grain that has a branched shape comprising approximately columnar portions and needle portions, the short direction of each site is represented by ds, and the minimum length of the branched magnetic crystal grain is represented by dl. A method for measuring dL, dS, ds and dl is the same as in Example 1. The film thicknesses of the following samples were 3 μm, and the magnetic property was obtained after heat treatment under a vacuum at 520° C.

The film-forming conditions in Example 2 are as follows:

Conditions for Examples aa to ag

Substrate: non-magnetic ceramic substrate

Substrate temperature: water cooling to 250° C.

Magnetic film target: FeAlSiTi alloy target

Target size: 3 inch

Discharge gas pressure: 1 to 4 mTorr

Main sputtering gas: Ar

Nitrogen flow ratio: 2 to 4%

Oxygen flow ratio: 0.5 to 2%

Discharge power: 400 W

Experiments for Comparative Examples are made by changing the conditions for Examples aa to ag to the following conditions.

Conditions for Comparative Examples ca to ce

Substrate temperature: changed to 300° C. or liquid nitrogen cooling

Conditions for Examples ba to bg

Substrate: non-magnetic ceramic substrate

Substrate temperature: water cooling to 250° C.

Magnetic film target: FeAlSiTi alloy target

Target size: 5 inch×15 inch

Discharge gas pressure: 1 to 4 mTorr

Main sputtering gas: Ar

Nitrogen flow ratio: 2 to 4%

Oxygen flow ratio: 0.5 to 2%

Discharge power: 2 kW

Experiments for Comparative Examples are made by changing the conditions for Examples ba to bg to the following conditions.

Conditions for Comparative Examples da to de

Substrate temperature: changed to 300° C. or liquid nitrogen cooling

TABLE 4

| | Coercive Force (Oe) | dS (nm) | dL (nm) |
|---|---|---|---|
| Example | | | |
| aa | 0.9 | 6 | 110 |
| ab | 0.3 | 10 | 220 |
| ac | 0.2 | 21 | 300 |
| ad | 0.1 | 20 | 420 |
| ae | 0.1 | 32 | 450 |
| af | 0.3 | 45 | 510 |
| ag | 0.6 | 58 | 620 |
| Comp. Ex. | | | |
| ca | 2.4 | 4 | 80 |
| cb | 1.4 | 5 | 120 |
| cc | 1.2 | 7 | 97 |
| cd | 1.6 | 67 | 660 |
| ce | 3.5 | 100 | 730 |

TABLE 5

| | Coercive Force (Oe) | dS (nm) | dL (nm) |
|---|---|---|---|
| Example | | | |
| ba | 0.7 | 6 | 110 |
| bb | 0.3 | 15 | 52 |
| bc | 0.02 | 25 | 450 |
| bd | 0.01 | 30 | 510 |
| be | 0.1 | 42 | 550 |
| bf | 0.2 | 70 | 740 |
| bg | 0.8 | 95 | 860 |
| Comp. Ex. | | | |
| da | 2.2 | 4 | 50 |
| db | 1.5 | 5 | 180 |
| dc | 1.3 | 7 | 40 |
| dd | 1.2 | 120 | 760 |
| de | 1.9 | 210 | 1230 |

Figure 2:
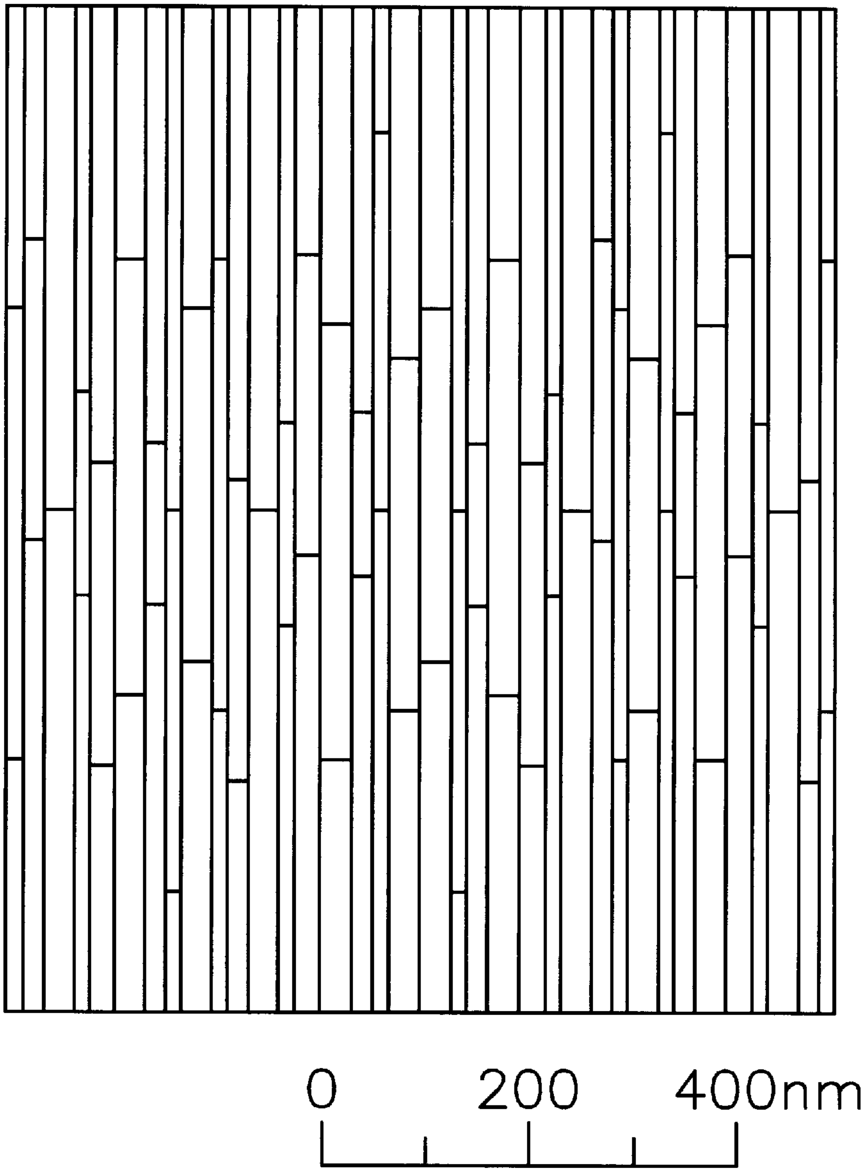
FIG. 2 is a schematic view in the direction of the growth of a magnetic film having columnar or needle crystal grains (an underlying film and a substrate are not shown).
Figure 3:
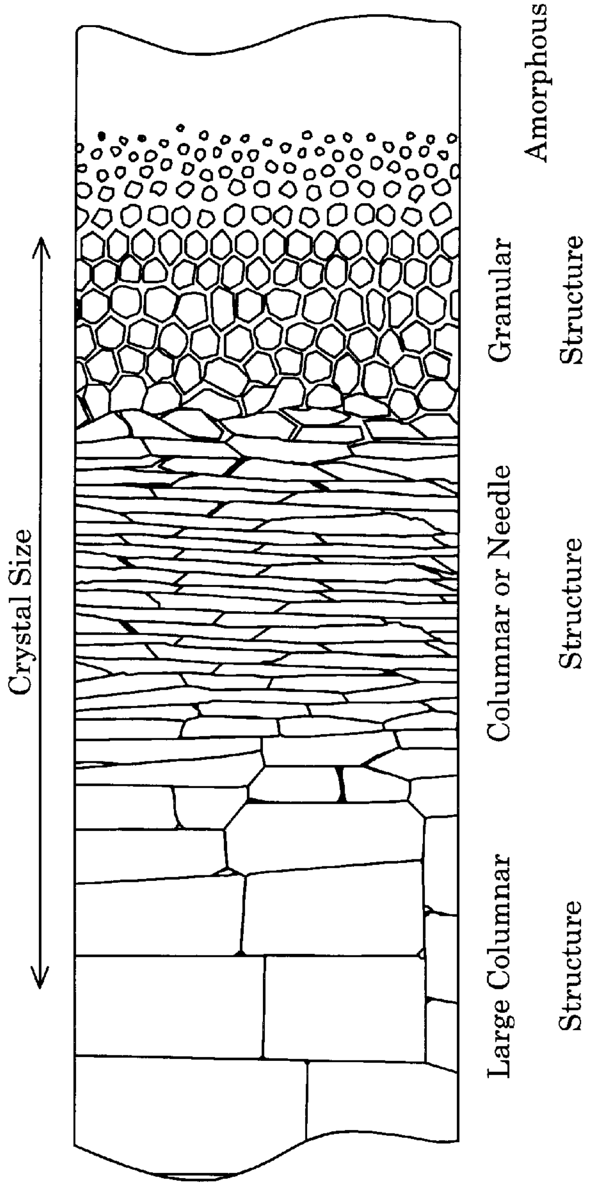
FIG. 3 is a schematic view of a magnetic film showing the changes in the film structure in response to the crystal size.

In Examples aa to ag, as shown in the schematic TEM cross-sectional view of FIG. 2, the magnetic crystal grains were grown substantially perpendicular to the substrate with approximately columnar or needle crystal grains as a mother phase. On the other hand, in Examples ba to bg, as shown in the schematic TEM cross-sectional view of FIG. 1, the magnetic crystal grains comprise branched crystal grains where at least two approximately columnar or needle crystal portions were joined together and approximately columnar or needle grains as the mother phase. It is believed that this resulted from the fact that the target size is larger than that in Examples aa to ag, so that more particles are introduced to the substrate obliquely, and thus the conditions for the growth of the crystal grains have been changed. Furthermore, it was confirmed that the branched shape was able to be realized, for example by a technique for forming a film while changing the position relationship between the substrate and the target so as to periodically change an angle of the particles introduced into the substrate.

When the film structure was observed on a face parallel to the surface of the substrate in all the samples of the Example 2 as well as Example 1, it was confirmed that the magnetic film comprised transformed circles, transformed ellipses or the combination of these shapes, and that the average surface area Sa and the average volume Va of the magnetic crystal grain sufficiently satisfied the following relationship: $Sa>4.84\ Va^{2/3}$.

Furthermore, the samples of Comparative Examples that did not satisfy at least one of the following conditions had poor magnetic properties: (1) $dl>50$ nm; 5 nm $<dS<$ 60 nm; and (3) $dL>100$ nm.

When the compositions of the samples of Comparative Examples were expressed by a composition formula: $(Fe_aSi_bAl_cTi_d)_{100-e-f}N_eO_f$, the number of a was in the range from 75 to 77, the number of b was in the range from 18 to 21, the number of c was in the range from 1 to 4, the number of d was in the range from 1 to 4, the number of e was in the range from 1 to 2, and the number of f was in the range from 4 to 9. In the case that substantially the same film was formed under the same conditions, a change in the composition within the above-mentioned range did not make such a difference in the magnetic property that can be seen between Examples and Comparative Examples.

Furthermore, also in the case that O and N in Example 2 were partially or totally substituted with B and C, or in the case that the branched crystal grains were obtained by changing the target size or the like with the same composition as in Example 1, the magnetic film having crystal grains whose size is in the above-mentioned preferable range had an excellent magnetic property.

Furthermore, in all the samples in Example 2, any crystal orientations of adjacent magnetic crystal grains were random in the inplane direction.

Furthermore, when the magnetic film of Example 2 was produced by DC magnetron sputtering, the resulting composition and crystal structure were substantially the same as above by changing the discharge gas pressure to 0.5 to 2 mTorr, and the power to 100 W. Moreover, it was confirmed that the magnetic film exhibited an excellent soft magnetic property immediately after the film was formed.

When the samples of Examples and Comparative Examples were immersed in 0.5 normal salt water for 50 hours, the samples of Comparative Examples were stained on the surface of the film or the interface between the film and the substrate. On the other hand, the samples of Examples were not stained.

Example 3

In Example 3, compositions and film structures such as crystal shapes were investigated on a magnetic film formed by RF magnetron sputtering under various conditions by changing sputtering conditions such as discharge gas pressure, substrate temperatures with various added elements at various reactant gas flow rates. The results are shown in Table 6.

The shape of the crystal grain and the grain boundary state were estimated by the TEM observation on the cross-section and the face parallel to the film in the same manner as above. The average minimum thickness T of a grain boundary compound was also estimated by the TEM observation. The film thicknesses of the following samples were 3 μm.

The film-forming conditions in Example 3 are as follows:

Conditions for Samples a to i

Substrate: non-magnetic ceramic substrate

Substrate temperature: room temperature

Magnetic film target: a complex target where an element or compound chip is placed on a Fe target Target size: 3 inch Discharge gas pressure: 2 to 4 mTorr Main sputtering gas: Ar Nitrogen flow ratio: 2 to 4%

Oxygen flow ratio: 0.5 to 2%

Discharge power: 400 W

Heat treatment temperature under vacuum: 500° C.

Additional experiments were made by changing the conditions for the above samples to the following conditions.

Conditions for Samples j to r

Heat treatment temperature under vacuum: from 500° C. to 600° C.

TABLE 6

| Sample | Film Composition (atom %) | Coercive Force (Oe) | T (nm) |
|---|---|---|---|
| a | $(Fe_{79}Si_{17}V_2Nb_2)_{92}O_2N_6$ | 0.3 | 2 |
| b | $(Fe_{79}Si_{17}V_2Ta_2)_{92}O_2N_6$ | 0.3 | 1 |
| c | $(Fe_{79}Si_{17}V_2Hf_2)_{92}O_2N_6$ | 0.4 | 1 |
| d | $(Fe_{78}Si_{17}Ti_2Nb_3)_{92}O_2N_6$ | 0.3 | 2 |
| e | $(Fe_{78}Si_{17}Ti_2Ta_3)_{92}O_2N_6$ | 0.2 | 2 |
| f | $(Fe_{78}Si_{17}Ti_2Hf_3)_{92}O_2N_6$ | 0.3 | 2 |
| g | $(Fe_{78}Si_{17}Ga_2Nb_3)_{94}O_1N_5$ | 0.5 | 3 |
| h | $(Fe_{78}Si_{17}Ga_2Ta_3)_{94}O_1N_5$ | 0.2 | 2 |
| i | $(Fe_{78}Si_{17}Ga_2Hf_3)_{94}O_1N_5$ | 0.4 | 1 |
| j | $(Fe_{79}Si_{17}V_2Nb_2)_{92}O_2N_6$ | 2.5 | 4 |
| k | $(Fe_{79}Si_{17}V_2Ta_2)_{92}O_2N_6$ | 2.3 | 4 |
| l | $(Fe_{79}Si_{17}V_2Hf_2)_{92}O_2N_6$ | 2.4 | 4 |
| m | $(Fe_{78}Si_{17}Ti_2Nb_3)_{92}O_2N_6$ | 2.1 | 5 |
| n | $(Fe_{78}Si_{17}Ti_2Ta_3)_{92}O_2N_6$ | 1.9 | 5 |
| o | $(Fe_{78}Si_{17}Ti_2Hf_3)_{92}O_2N_6$ | 2.0 | 4 |
| p | $(Fe_{78}Si_{17}Ga_2Nb_3)_{94}O_1N_5$ | 2.6 | 4 |
| q | $(Fe_{78}Si_{17}Ga_2Ta_3)_{94}O_1N_5$ | 2.5 | 4 |
| r | $(Fe_{78}Si_{17}Ga_2Hf_3)_{94}O_1N_5$ | 2.2 | 4 |

In Example 3, the crystal grain sizes of all the samples are within the preferable range described above, and it is believed that the difference in the magnetic properties resulted from the thickness of the grain boundary compound. Furthermore, also in the case that O and N in Example 3 were partially or totally substituted with B and C, the same correlation between the magnetic property and the grain boundary structure was obtained.

After the samples of Samples a to i were immersed in pure water for 24 hours, the samples did not corrode. No basic difference in the structure of the crystal grains, the size of the grain boundary compound or the like were seen between the samples of Example aa to az of Example 1 and the samples of Example a to i of Example 3. However, when examining with an EDS annexed to the TEM, the crystal grains of Examples aa to az comprised substantially no element having a lower free energy for the formation of an oxide or a nitride than Fe. On the other hand, the crystal grains of Examples a to i comprised at least 10 atomic % or so of the element.

Furthermore, also in the case that the magnetic film of the present example was formed so as to comprise branched crystal grains with the preferable size by sputtering that allows more components to be introduced obliquely, the same effect was confirmed.

Furthermore, when the magnetic film of Example 3 was produced by DC magnetron sputtering, the resulting composition and crystal structure were substantially the same as above by changing the discharge gas pressure to 0.5 to 2 mTorr, and the power to 100 W. Moreover, it was confirmed that the magnetic film exhibited an excellent soft magnetic property immediately after the film was formed.

Example 4

In Example 4, various underlying films were formed on a substrate by RF magnetron sputtering, and a magnetic film was formed on each underlying film. Then, the film structure and the magnetic property were investigated. The results are shown in Table 7. In the present examples and comparative examples, $(Fe_{80}Si_{17}Al_1Nb_2)_{94}O_1N_5$ $(Fe_{75.2}Si_{15.98}Al_{0.94}Nb_{1.88}O_1N_5)$ that was formed under the same conditions was used as the magnetic film.

The film-forming conditions for the magnetic film are as follows:

Conditions for forming the magnetic film

Substrate temperature: room temperature

Magnetic film target: a complex target where an element or compound chip is placed on a Fe target Target size: 3 inch Discharge gas pressure: 2 to 4 mTorr Main sputtering gas: Ar Nitrogen flow ratio: 2%

Oxygen flow ratio: 0.5%

Discharge power: 400 W

The crystal state of the magnetic film was examined with XRD. The thicknesses of the following samples were 1 μm, and the magnetic property in Table 7 was obtained after heat treatment at 500° C. under a vacuum for 30 min.

The film-forming conditions for the underlying film are as follows:

Conditions for forming the underlying film

Substrate: non-magnetic ceramic substrate

Substrate temperature: room temperature

Underlying film target: a complex target where an element or compound chip is placed on a Fe target Target size: 3 inch Discharge gas pressure: 4 mTorr Main sputtering gas: Ar Nitrogen flow ratio: 0 to 20%

Oxygen flow ratio: 0 to 20%

Discharge power: 100 W

The thickness of the underlying film is 2 μm.

TABLE 7

| Sample | Underlying film | Coercive Force (Oe) | Surface Free Energy of Underlying Layer and Fe |
|---|---|---|---|
| a | MgO | 0.2 | <Fe |
| b | CaO | 0.4 | " |
| c | SrO | 0.8 | " |
| d | BaO | 0.7 | " |
| e | $TiO_2$ | 0.5 | " |
| f | $ZrO_2$ | 0.5 | " |
| g | $V_2O_5$ | 0.6 | " |
| h | $Nb_2O_5$ | 0.4 | " |
| i | $Al_2O_3$ | 0.7 | " |
| j | $Ga_2O_3$ | 0.9 | " |
| k | $SiO_2$ | 0.8 | " |
| l | $GeO_2$ | 0.9 | " |
| m | TiC | 0.7 | " |
| n | $B_4C$ | 0.6 | " |
| o | AlN | 0.7 | " |
| p | TiN | 0.6 | " |
| q | $SiN_4$ | 0.6 | " |
| r | Ta | 4.3 | >Fe |
| s | Zr | 3.5 | " |
| t | Mo | 2.5 | " |
| u | Ni | 1.5 | " |
| v | Co | 1.4 | " |

Since the surface free energy value varies depending on the measurement method, a magnitude relative to Fe is only shown in Table 7. From the results of the XRD and TEM analysis, grains are grown significantly in Samples r to v, which seems to cause the degradation of the magnetic property. Furthermore, the underlying film comprises an amorphous portion at a high ratio. Therefore, the underlying film is expressed by a molecular formula for the sake of convenience in Table 7, but an actual composition does not strictly match the stoichiometric ratio. In addition, in order to evaluate the effect of the present example, the magnetic properties of Samples a and i were investigated with a MgO substrate and an alumina substrate, respectively, which are single crystal substrates. The results revealed that the magnetic properties of the samples were further improved. Furthermore, it was confirmed that the underlying film of the present example provided the same effect with other magnetic thin films, as long as the magnetic thin film has the preferable crystal grain structure as described above.

Example 5

In Example 5, various underlying films were formed on a substrate by RF magnetron sputtering, and a magnetic film was formed on each underlying film. Then, the reaction between the substrate and the film was investigated. The results are shown in Table 8. In the present examples and comparative examples, $(Fe_{80}Si_{17}Al_1Nb_2)_{94}O_1N_5$ that was formed under the same conditions as in Example 4 was used as the magnetic film.

The film-forming conditions for the magnetic film are as follows:

Conditions for forming the magnetic film

Substrate temperature: room temperature

Magnetic film target: a complex target where an element or compound chip is placed on a Fe target Target size: 3 inch Discharge gas pressure: 4 mTorr Main sputtering gas: Ar Nitrogen flow ratio: 2%

Oxygen flow ratio: 0.5%

Discharge power: 400 W

The film-forming conditions for the underlying film are as follows:

Conditions for forming the underling film

Substrate: ferrite substrate

Substrate temperature: room temperature

Underlying film target: an element or compound target

Target size: 3 inch

Discharge gas pressure: 4 mTorr

Main sputtering gas: Ar

Nitrogen flow ratio: 0 to 20%

Oxygen flow ratio: 0 to 20%

Discharge power: 100 W

For the underlying films of Samples a to k, a film composed of a single element shown in Table 8 was formed on the ferrite substrate in a thickness of 2 nm, and then an oxide, a carbide, or a nitride of the same element was formed in a thickness of 1 nm. For the underlying films of Samples l to v, only an oxide, a carbide, or a nitride of the same element was formed in a thickness of 2 nm.

After the underlying film was formed, the magnetic film was formed in a thickness of 15 nm, and then alumina was formed in a thickness of 5 nm as an antioxidant film. Furthermore, a heat treatment was performed at 700° C., and the reaction between the ferrite substrate and the film was examined by observing discoloration on the surface of the film.

TABLE 8

The Underlying films

| Sample | Underlying film | Discoloration |
|---|---|---|
| a | Mg/MgO | No |
| b | $Ti/TiO_2$ | " |
| c | $Zr/ZrO_2$ | " |
| d | $V/V_2O_5$ | " |
| e | $Nb/Nb_2O_5$ | " |
| f | $Al/Al_2O_3$ | " |
| g | $Si/SiO_2$ | " |
| h | Ti/TiC | " |
| i | Al/AlN | " |
| j | Ti/TiN | " |
| k | $Si/SiN_4$ | " |
| l | MgO | Yes |
| m | $TiO_2$ | " |
| n | $ZrO_2$ | " |
| o | $V_2O_5$ | " |
| p | $Nb_2O_5$ | " |
| q | $Al_2O_3$ | " |
| r | $SiO_2$ | " |
| s | TiC | " |
| t | AlN | " |
| u | TiN | " |
| v | $SiN_4$ | " |

As seen from Table 8, the underlying film structure of Samples a to k allows mutual diffusion between the substrate and the film to be suppressed, even if a reactive substrate such as ferrite is used. Furthermore, when a magnetic film was formed in a thickness of 3 μm on the underlying film of Samples a to k, the magnetic property was substantially the same as in Example 4.

Furthermore, also in the case that the magnetic film of the present example is formed so as to comprise branched crystal grains with the preferable size by sputtering that allows more components to be introduced obliquely, the same effect was confirmed.

Example 6

In Example 6, various underlying films were formed on a substrate by RF magnetron sputtering, and a magnetic film was formed on each underlying film. Then, the film structure and the magnetic property were investigated. The results are shown in Table 9. In the present examples and comparative examples, $(Fe_{79}Si_{17}Al_1Ta_3)_{92}N_8$ that was formed under the same conditions was used as the magnetic film.

The film-forming conditions for the magnetic film are as follows:

Conditions for forming the magnetic film

Substrate temperature: room temperature

Magnetic film target: a complex target where an element or compound chip is placed on a Fe target Target size: 3 inch Discharge gas pressure: 4 mTorr Main sputtering gas: Ar Nitrogen flow ratio: 4%

Discharge power: 400 W

The crystal state of the magnetic film was investigated with a XRD. The thicknesses of the following samples were 1 μm, and the magnetic property in Table 9 was obtained after heat treatment at 500° C. under a vacuum for 30 min.

The film-forming conditions for the underlying film are as follows:

Conditions for forming the underlying film

Substrate: non-magnetic ceramic substrate

Substrate temperature: room temperature

Underlying film target: each element target

Target size: 3 inch

Discharge gas pressure: 4 mTorr

Sputtering gas: Ar

Discharge power. 100 W

The thickness of the underlying film is 2 nm.

TABLE 9

| Sample | Underlying film | Coercive Force (Oe) | Surface Free Energy of Underlying. Layer and Fe |
|---|---|---|---|
| a | C | 0.7 | <Fe |
| b | Al | 0.5 | " |
| c | Si | 0.5 | " |
| d | Ag | 0.4 | " |
| e | Cu | 0.6 | " |
| f | Cr | 0.9 | " |
| g | Mg | 0.4 | " |
| h | Au | 0.6 | " |
| i | Ga | 0.4 | " |
| j | Zn | 0.5 | " |
| r | Ta | 3.8 | >Fe |
| s | Zr | 3.2 | " |
| t | Mo | 2.6 | " |
| u | Ni | 1.7 | " |

From the results of the XRD and TEM analysis, grains are grown significantly in Samples r to u, which seems to cause the degradation of the magnetic property. It was confirmed that the underlying films of Samples a to j were effective with other magnetic thin films, as long as the magnetic film has the preferable crystal grain structure as described above. Furthermore, the underlying films of Example 6 were formed directly on the substrate, but it was confirmed that a reaction at the interface between the substrate and the underlying film can be suppressed by sandwiching a thin film formed of a compound of an oxide, a carbide, a nitride, or a boride between the substrate and the underlying film.

Example 7

In Example 7, various underlying films were formed on a substrate by RF magnetron sputtering, and a magnetic film was formed on each underlying film under the same conditions. Then, the film structure and the magnetic property were investigated. The results are shown in Table 10 below. In the present examples and comparative examples, $(Fe_{75}Si_{20}Al_{3}Ti_{2})_{94}O_{1}N_{5}$ that was formed under the same conditions was used as the magnetic film.

The film-forming conditions for the magnetic film are as follows:

Conditions for forming the magnetic film

Substrate temperature: room temperature

Magnetic film target: FeSiAlTi alloy target

Target size: 3 inch

Discharge gas pressure: 4 mTorr

Main sputtering gas: Ar

Nitrogen flow ratio: 2%

Oxygen flow ratio: 0.5%

Discharge power: 300 W

The total thickness of the following samples was 3 μm, and the magnetic property shown in Table 10 was obtained after heat treatment at 500° C. under a vacuum for 30 min. Hereinafter, the underlying films of Samples a to o are referred to as "underlying films a to o" (in the case of a multi-layer, the layer that is closest to the substrate is represented by $a_1$, and the next layer is $a_2$, and so on).

For underlying films a to c, alumina was formed on a substrate in a thickness of 4 nm as barrier films $a_1$ to $c_1$, and then nitride layers or oxide layers were formed in a thickness of 0.5 nm to 10 nm in an Ar and nitrogen gas or an Ar and oxygen gas as underlying films $a_2$ to $c_2$, using the same target as the magnetic film.

The film-forming conditions for the underlying films a to c are as follows:

Conditions for forming the underlying films a to c

Substrate: ferrite substrate

Substrate temperature: room temperature

Underlying film and barrier film target:

alumina target

FeSiAlTi alloy target

Target size: 3 inch

Discharge gas pressure: 4 mTorr

Sputtering gas:

(alumina formation) Ar (nitride layer formation) $Ar+N_2$; $N_2$ flow ratio 15%

(oxide layer formation) $Ar+O_2$; $O_2$ flow ratio 10%

Discharge power: 100 W

For underlying layers d to 1, alumina was formed on a substrate in a thickness of 4 nm as barrier layers $d_1$ to $l_1$, and then films were formed in a thickness of 0.3 nm to 200 nm as secondary magnetic layers $d_2$ to $l_2$ under the same conditions as the magnetic film. Thereafter, oxide films were formed in a thickness of 0.03 to 15 nm in an Ar and $O_2$ gas as parting layers $d_3$ to $l_3$, using the same target as the magnetic film.

The film-forming conditions for the underlying films d to l are as follows:

Conditions for forming the underlying films d to l

Substrate: ferrite substrate

Substrate temperature: room temperature

Underlying film and barrier film target:

alumina target

FeSiAlTi alloy target

Target size: 3 inch

Discharge gas pressure: 4 mTorr

Sputtering gas:

(alumina formation) Ar (secondary magnetic layer formation) $Ar+O_2N_2$;

$O_2$ flow ratio 0.5%

$N_2$ flow ratio 2%

(parting layer formation) $Ar+O_2$; $O_2$ flow ratio 5%

Discharge power:

(alumina and parting layer formation) 100 W (secondary magnetic layer formation) 300 W For underlying layers m and n, alumina was formed on a substrate in a thickness of 4 nm as barrier layers $m_1$ and $n_1$, and then $(Fe_{75}Si_{20}Al_{8}Ti_{2})_{94}O_{1}N_{5}$ that is the same as the main magnetic film was formed in a thickness of 10 nm or 100 nm as secondary magnetic layers $m_2$ and $n_2$. Thereafter, silicon nitride films were formed in a thickness of 2 nm in an Ar and $O_2$ gas as parting layers $m_3$ and $n_3$, using a silicon nitride target.

The film-forming conditions for the underlying films m and n are as follows:

Conditions for forming the underlying films m and n

Substrate: ferrite substrate

Substrate temperature: room temperature

Underlying film and barrier film target:

alumina target

FeSiAlTi alloy target $Si_3N_4$ target

Target size: 3 inch

Discharge gas pressure: 4 mTorr

Sputtering gas:

(alumina formation) Ar (secondary magnetic layer formation) $Ar+O_2+N_2$;

$O_2$ flow ratio 0.5%

$N_2$ flow ratio 2%

(parting layer formation) $Ar+N_2$; $N_2$ flow ratio 10%

Discharge power:

(alumina and parting layer formation) 100 W (secondary magnetic layer formation) 300 W For underlying layer o, only alumina was formed in a thickness of 4 nm as a barrier layer.

The film-forming conditions for the underlying film o are as follows:

Conditions for forming the underlying film o

Substrate: ferrite substrate

Substrate temperature: room temperature

Barrier film target: alumina target

Target size: 3 inch

Discharge gas pressure: 4 mTorr

Sputtering gas: Ar

Discharge power: 100 W

TABLE 10

| Sample | Underlying Structure of the Substrate: Barrier Layer/Sec. Magn. Layer/Parting Layer | Coercive Force (Oe) |
|---|---|---|
| a | $Al_2O_3$ (4 nm)/FeSiAlTiN (0.5 nm) | 0.1 |
| b | $Al_2O_3$ (4 nm)/FeSiAlTiN (10 nm) | 0.09 |
| c | $Al_2O_3$ (4 nm)/FeSiAlTiO (0.5 nm) | 0.15 |
| d | $Al_2O_3$ (4 nm)/FeSiAlTiON (0.3 nm)/FeSiAlTiO (0.5 nm) | 0.3 |
| e | $Al_2O_3$ (4 nm)/FeSiAlTiON (0.5 nm)/FeSiAlTiO (0.5 nm) | 0.15 |
| f | $Al_2O_3$ (4 nm)/FeSiAlTiON (10 nm)/FeSiAlTiO (0.03 nm) | 0.3 |
| g | $Al_2O_3$ (4 nm)/FeSiAlTiON (10 nm)/FeSiAlTiO (0.05 nm) | 0.15 |
| h | $Al_2O_3$ (4 nm)/FeSiAlTiON (10 nm)/FeSiAlTiO (0.5 nm) | 0.02 |
| i | $Al_2O_3$ (4 nm)/FeSiAlTiON (10 nm)/FeSiAlTiO (10 nm) | 0.03 |
| j | $Al_2O_3$ (4 nm)/FeSiAlTiON (10 nm)/FeSiAlTiO (15 nm) | 0.1* |
| k | $Al_2O_3$ (4 nm)/FeSiAlTiON (100 nm)/FeSiAlTiO (0.5 nm) | 0.05 |
| l | $Al_2O_3$ (4 nm)/FeSiAlTiON (200 nm)/FeSiAlTiO (0.5 nm) | 0.2** |
| m | $Al_2O_3$ (4 nm)/FeSiAlTiON (10 nm)/$SiN_4$ (2 nm) | 0.06 |
| n | $Al_2O_3$ (4 nm)/FeSiAlTiON (100 mm)/$SiN_4$ (2 nm) | 0.05 |
| o | $Al_2O_3$ (4 nm) | 0.3 |

Since the film of the present example itself has the preferable crystal grain structure and composition, the film retains the excellent magnetic property. The samples a to c, e and g to n have further improved magnetic properties. Sample j marked with * in Table 10 has a parting layer with a thickness as large as 15 nm. Therefore, in the case that the sample j is used as a MIG head material, this parting layer may generate a pseudo-gap. However, there is no problem in using the sample j for a LAM head. Sample l marked with ** has a low coercive force, but it is not preferable to use the sample l for a MIG head, because it has a stepped hysteresis curve and the magnetic property of this secondary magnetic layer determines a head-output property. However, again, there is no problem in using it for a LAM head.

The underlying structure of the present example provides the advantageous effect of improving the magnetic property, as long as the magnetic film has the preferable structure or the preferable composition of the present invention. Furthermore, the composition that can be used for the underlying film is not particularly limited, and for example, any one of an oxide a nitride, a carbide, and a boride can be used in place of alumina for obtaining the same advantageous effect. Furthermore, in the case of the samples a to c, an oxide or a nitride of a magnetic target was used, but a boride or a carbide can be used. In the samples e to n, the same magnetic film as the main magnetic film was formed as the secondary magnetic layer, but any metal magnetic layer provides the same advantageous effect. Furthermore, an oxide of the main magnetic film or silicon nitride was used as the parting layer, but it was confirmed that the same advantageous effect can be obtained with an amorphous material, a metal element, or a non-metal element that has different crystal structure from the main magnetic film.

Example 8

In Example 8, the magnetic properties of magnetic films formed on a substrate by RF magnetron sputtering with different added elements at different reactant gas flow ratios were investigated. The results are shown in Table 11 below. The thicknesses of the following samples were 3 $\mu$m, and the magnetic property was obtained after heat treatment at 520° C. under a vacuum.

The film-forming conditions for the magnetic film are as follows:

Conditioning for forming the magnetic film

Substrate: non-magnetic ceramic substrate

Substrate temperature: room temperature

Magnetic film target: a complex target where an element or compound chip is placed on a Fe target Target size: 3 inch Discharge gas pressure: 1 to 4 mTorr Main sputtering gas: Ar Nitrogen flow ratio: 0 to 8%

Discharge power: 400 W

TABLE 11

| | | Film Composition (atom %) | Coercive Force (Oe) |
|---|---|---|---|
| Example | aa | $(Fe_{70}Si_{26}Al_3Ta_1)_{92}N_8$ | 0.3* |
| Example | ab | $(Fe_{73}Si_{23}Al_3Ta_1)_{92}N_8$ | 0.1 |
| Comp. Ex. | ac | $(Fe_{78}Si_{19}Al_3)_{92}N_8$ | 1.2 |
| Example | ad | $(Fe_{80.9}Si_{19}Ta_{0.1})_{92}N_8$ | 0.5 |
| Example | ae | $(Fe_{77.9}Si_{19}Al_3Ta_{0.1})_{92}N_8$ | 0.3 |
| Example | af | $(Fe_{78}Si_{19}Al_2Ta_1)_{92}N_8$ | 0.2 |
| Comp. Ex. | ag | $Fe_{77}Si_{19}Al_3Ta_1$ | 2.0 |
| Example | ah | $(Fe_{77}Si_{19}Al_3Ta_1)_{99}N_1$ | 0.5 |
| Example | ai | $(Fe_{77}Si_{19}Al_3Ta_1)_{92}N_8$ | 0.1 |
| Example | aj | $(Fe_{77}Si_{19}Al_3Ta_1)_{90}N_{10}$ | 0.3 |
| Comp. Ex. | ak | $(Fe_{77}Si_{19}Al_3Ta_1)_{89}N_{11}$ | 1.1 |

TABLE 11-continued

| | | Film Composition (atom %) | Coercive Force (Oe) |
|---|---|---|---|
| Example | al | $(Fe_{76}Si_{19}Al_4Ta_1)_{92}N_8$ | 0.1 |
| Example | am | $(Fe_{74}Si_{19}Al_6Ta_1)_{92}N_8$ | 0.2 |
| Example | an | $(Fe_{73}Si_{19}Al_6Ta_2)_{92}N_8$ | 0.3 |
| Example | ao | $(Fe_{75}Si_{19}Al_1Ta_5)_{92}N_8$ | 0.9 |
| Comp. Ex. | ap | $(Fe_{72}Si_{19}Al_2Ta_7)_{92}N_8$ | 3.6 |
| Comp. Ex. | aq | $(Fe_{71}Si_{19}Al_4Ta_6)_{92}N_8$ | 3.3 |
| Example | ar | $(Fe_{79}Si_{17}Al_3Ta_1)_{90}N_{10}$ | 0.3 |
| Example | as | $(Fe_{79}Si_{17}Al_3Ta_1)_{92}N_8$ | 0.2 |
| Example | at | $(Fe_{79}Si_{17}Al_3Ta_1)_{94}N_6$ | 0.4 |
| Example | au | $(Fe_{78}Si_{17}Al_4Ta_1)_{92}N_8$ | 0.2 |
| Example | av | $(Fe_{78}Si_{17}Al_3Ta_2)_{92}N_8$ | 0.4 |
| Example | aw | $(Fe_{77}Si_{17}Al_4Ta_2)_{92}N_8$ | 0.3 |
| Example | ax | $(Fe_{86}Si_{10}Al_3Ta_1)_{90}N_{10}$ | 0.5 |
| Example | ay | $(Fe_{86}Si_{10}Al_3Ta_1)_{92}N_8$ | 0.4 |
| Example | az | $(Fe_{86}Si_{10}Al_3Ta_1)_{94}N_6$ | 0.6 |
| Example | aa | $(Fe_{85}Si_{10}Al_4Ta_1)_{92}N_8$ | 0.3 |
| Example | bb | $(Fe_{85}Si_{10}Al_3Ta_2)_{92}N_8$ | 0.5 |
| Example | bc | $(Fe_{84}Si_{10}Al_4Ta_2)_{92}N_8$ | 0.4 |
| Example | bd | $(Fe_{87}Si_9Al_3Ta_1)_{92}N_8$ | 0.5** |

When all of the above samples were subjected to a salt-spraying test according to JIS, all the samples of Example 8 exhibited a satisfactory corrosion resistance.

The sample of Comparative Example ag has the same composition as the sample of Example ah except nitrogen. The sample of Comparative Example ag exhibited lower corrosion resistance than the sample of Example ah, although more anti-corrosion elements are present in the magnetic crystal grains due to the absence of nitrogen. Thus, it is effective to add a trace of nitrogen for improving the corrosion resistance. Furthermore, the sample of Comparative Example ac exhibited a satisfactory magnetic property after the heat treatment at 400° C., but degraded at 520° C. On the other hand, it was confirmed that the sample of Example ae had an improved heat treatment stability of the magnetic property due to the addition of a trace of Ta.

The sample of Example aa marked with * exhibited a satisfactory soft magnetic property and corrosion resistance, but the saturation magnetic flux density was as low as 1 T or less. However, the saturation magnetic flux density is higher than that of ferrite, and since the sample of Example aa has the most excellent corrosion resistance, it has sufficient characteristics for use in a magnetic coil. The sample of Example bd marked with * * exhibited a satisfactory soft magnetic property, but corroded slightly as a result of the salt-spraying test. However, the sample of Example bd has sufficient performance for use in a non-transportable VTR or a hard disc that is less demanding in terms of resistance against surroundings. The FeSiAiTaN material used in Example 8 further improves the magnetic property by forming a film of this material on the preferable underlying film of the present invention.

Furthermore, when the magnetic film of the present example was formed so as to comprise branched crystal grains with the preferable size by sputtering that allows more components to be introduced obliquely, the same effect also was confirmed.

Example 9

In Example 9, the magnetic properties of magnetic films that were formed on a substrate by RF magnetron sputtering with different added elements at different reactant gas flow ratios were investigated. The results are shown in Table 12 below. The thicknesses of the following samples were 3 μm, and the magnetic property was obtained after heat treatment at 520° C. under a vacuum.

The film-forming conditions for the magnetic film are as follows:

Conditions for forming the magnetic film

Substrate: non-magnetic ceramic substrate

Substrate temperature: room temperature

Magnetic film target: a complex target where an element or compound chip is placed on a Fe target Target size: 3 inch Discharge gas pressure: 1 to 4 mTorr Main sputtering gas: Ar Nitrogen flow ratio: 0 to 8%

Discharge power: 400 W

TABLE 12

| | | Film Composition (atom %) | Coercive Force (Oe) |
|---|---|---|---|
| Example | aa | $(Fe_{69}Si_{26}Al_3Ti_2)_{92}N_8$ | 0.3* |
| Example | ab | $(Fe_{72}Si_{23}Al_3Ti_2)_{92}N_8$ | 0.2 |
| Comp. Ex. | ac | $(Fe_{78}Si_{19}Al_3)_{92}N_8$ | 1.3 |
| Example | ad | $(Fe_{80.9}Si_{19}Ti_{0.1})_{92}N_8$ | 0.6 |
| Example | ae | $(Fe_{77.9}Si_{19}Al_3Ti_{0.1})_{92}N_8$ | 0.4 |
| Example | af | $(Fe_{77}Si_{19}Al_2Ti_2)_{92}N_8$ | 0.3 |
| Comp. Ex. | ag | $Fe_{76}Si_{19}Al_3Ti_2$ | 1.5 |
| Example | ah | $(Fe_{76}Si_{19}Al_3Ti_2)_{99}N_1$ | 0.6 |
| Example | ai | $(Fe_{76}Si_{19}Al_3Ti_2)_{92}N_8$ | 0.2 |
| Example | aj | $(Fe_{76}Si_{19}Al_3Ti_2)_{90}N_{10}$ | 0.5 |
| Comp. Ex. | ak | $(Fe_{76}Si_{19}Al_3Ti_2)_{89}N_{11}$ | 2.1 |
| Example | al | $(Fe_{75}Si_{19}Al_4Ti_2)_{92}N_8$ | 0.2 |
| Example | am | $(Fe_{73}Si_{19}Al_6Ti_2)_{92}N_8$ | 0.3 |
| Example | an | $(Fe_{73}Si_{19}Al_5Ti_3)_{92}N_8$ | 0.3 |
| Example | ao | $(Fe_{73}Si_{19}Al_3Ti_5)_{92}N_8$ | 0.9 |
| Comp. Ex. | ap | $(Fe_{72}Si_{19}Al_2Ti_7)_{92}N_8$ | 2.6 |
| Comp. Ex. | aq | $(Fe_{72}Si_{19}Al_4Ti_5)_{92}N_8$ | 2.3 |
| Example | ar | $(Fe_{78}Si_{17}Al_3Ti_2)_{90}N_{10}$ | 0.4 |
| Example | as | $(Fe_{78}Si_{17}Al_3Ti_2)_{92}N_8$ | 0.3 |
| Example | at | $(Fe_{78}Si_{17}Al_3Ti_2)_{94}N_6$ | 0.5 |
| Example | au | $(Fe_{77}Si_{17}Al_4Ti_2)_{92}N_8$ | 0.2 |
| Example | av | $(Fe_{76}Si_{17}Al_5Ti_2)_{92}N_8$ | 0.3 |
| Example | aw | $(Fe_{75}Si_{17}Al_5Ti_3)_{92}N_8$ | 0.3 |
| Example | ax | $(Fe_{85}Si_{10}Al_3Ti_2)_{90}N_{10}$ | 0.4 |
| Example | ay | $(Fe_{85}Si_{10}Al_3Ti_2)_{92}N_8$ | 0.4 |
| Example | az | $(Fe_{85}Si_{10}Al_3Ti_2)_{94}N_6$ | 0.5 |
| Example | ba | $(Fe_{84}Si_{10}Al_4Ti_2)_{92}N_8$ | 0.4 |
| Example | bb | $(Fe_{83}Si_{10}Al_5Ti_2)_{92}N_8$ | 0.3 |
| Example | bc | $(Fe_{82}Si_{10}Al_5Ti_3)_{92}N_8$ | 0.4 |
| Example | bd | $(Fe_{86}Si_9Al_3Ti_2)_{92}N_8$ | 0.7 |

When all of the above samples were subjected to a salt-spraying test according to JIS, all the samples of Example 9 exhibited a satisfactory corrosion resistance. As in Example 8, the comparison between Comparative Example ag and Example ah revealed that it is effective to add a trace of nitrogen for improving the corrosion resistance. Furthermore, the comparison between Comparative Example ac and Example ae revealed that the heat treatment stability of the magnetic property was improved due to the addition of a trace of Ti.

The sample of Example aa marked with * exhibited a satisfactory soft magnetic property and corrosion resistance, but the saturation magnetic flux density was as low as 1 T or less. However, the saturation magnetic flux density is higher than that of ferrite, and since the sample of Example aa has the most excellent corrosion resistance, it has sufficient characteristics for use in a magnetic coil. The sample of Example bd marked with * * exhibited a satisfactory soft magnetic property, but corroded slightly as a result of the salt-spraying test. However, the sample of Example bd has sufficient performance for use in a non-transportable VTR or a hard disc that is less demanding in terms of resistance against surroundings. The FeSiAiTiN material used in Example 9 further improves the magnetic property by forming a film of this material on the preferable underlying film of the present invention.

In Example 8, Ta was used, and in Example 9, Ti was used. However, it was confirmed that, even when Ta or Ti was partially or totally substituted with at least one selected from the group consisting of Zr, Hf, V, Nb, and Cr; Si was partially or totally substituted with Ge; or Al was partially or totally substituted with Ga or Cr, the magnetic film also had excellent corrosion resistance and magnetic property.

Furthermore, when the magnetic film of the present example was formed so as to comprise branched crystal grains with the preferable size by sputtering that allows more components to be introduced obliquely, the same effect also was confirmed.

Example 10

In Example 10, the magnetic properties of magnetic films that were formed on a substrate by RF magnetron sputtering with different added elements at different reactant gas flow ratios were investigated. The results are shown in Tables 13 to 15 below. The thicknesses of the following samples were 3 μm, and the magnetic property was obtained after heat treatment at 520° C. under a vacuum.

The film-forming conditions for the magnetic film are as follows:

Conditions for forming the magnetic film

Substrate: non-magnetic ceramic substrate

Substrate temperature: room temperature

Magnetic film target: a complex target where an element or compound chip is placed on a Fe target Target size: 3 inch Discharge gas pressure: 1 to 4 mTorr Main sputtering gas: Ar Nitrogen flow ratio: 0 to 8%

Oxygen flow ratio: 0.5 to 2%

Discharge power: 400 W

TABLE 13

| | | Film Composition (atom %) | Coercive Force (Oe) |
|---|---|---|---|
| Example | aa | $(Fe_{71}Si_{26}Al_3Ti_2)_{94}O_1N_5$ | 0.2* |
| Example | ab | $(Fe_{71}Si_{26}Al_3Ti_2)_{92}O_2N_6$ | 0.2* |
| Example | ac | $(Fe_{72}Si_{23}Al_3Ti_2)_{94}O_1N_5$ | 0.1 |
| Example | ad | $(Fe_{72}Si_{23}Al_3Ti_2)_{92}O_2N_6$ | 0.2 |
| Comp. Ex. | ae | $(Fe_{78}Si_{19}Al_3)_{94}O_1N_5$ | 1.3 |
| Comp. Ex. | af | $(Fe_{78}Si_{19}Al_3)_{92}O_2N_6$ | 1.4 |
| Example | ag | $(Fe_{80.9}Si_{19}Ti_{0.1})_{94}O_1N_5$ | 0.4 |
| Example | ah | $(Fe_{80.9}Si_{19}Ti_{0.1})_{92}O_2N_6$ | 0.5 |
| Example | ai | $(Fe_{77.9}Si_{19}Al_3Ti_{0.1})_{94}O_1N_5$ | 0.4 |
| Example | aj | $(Fe_{77.9}Si_{19}Al_3Ti_{0.1})_{92}O_2N_6$ | 0.4 |
| Example | ak | $(Fe_{77}Si_{19}Al_2Ti_2)_{94}O_1N_5$ | 0.2 |
| Example | al | $(Fe_{77}Si_{19}Al_2Ti_2)_{92}O_2N_6$ | 0.2 |
| Comp. Ex. | am | $Fe_{76}Si_{19}Al_3Ti_2$ | 1.5 |
| Example | an | $(Fe_{76}Si_{19}Al_3Ti_2)_{99}O_1$ | 0.8 |
| Example | ao | $(Fe_{76}Si_{19}Al_3Ti_2)_{98}O_1N_1$ | 0.7 |
| Example | ap | $(Fe_{76}Si_{19}Al_3Ti_2)_{94}O_1N_5$ | 0.1 |
| Example | aq | $(Fe_{76}Si_{19}Al_3Ti_2)_{90}O_1N_9$ | 0.3 |
| Comp. Ex. | ar | $(Fe_{76}Si_{19}Al_3Ti_2)_{89}O_1N_{10}$ | 1.3 |
| Example | as | $(Fe_{76}Si_{19}Al_3Ti_2)_{93}O_2N_5$ | 0.1 |
| Example | at | $(Fe_{76}Si_{19}Al_3Ti_2)_{92}O_2N_6$ | 0.1 |
| Example | au | $(Fe_{76}Si_{19}Al_3Ti_2)_{90}O_2N_8$ | 0.3 |

TABLE 13-continued

| | | Film Composition (atom %) | Coercive Force (Oe) |
|---|---|---|---|
| Comp. Ex. | av | $(Fe_{76}Si_{19}Al_3Ti_2)_{89}O_2N_9$ | 1.4 |
| Example | aw | $(Fe_{76}Si_{19}Al_3Ti_2)_{92}O_3N_5$ | 0.7 |
| Example | ax | $(Fe_{76}Si_{19}Al_3Ti_2)_{90}O_3N_7$ | 0.8 |
| Comp. Ex. | ay | $(Fe_{76}Si_{19}Al_3Ti_2)_{89}O_3N_8$ | 1.4 |
| Example | az | $(Fe_{75}Si_{19}Al_4Ti_2)_{94}O_1N_5$ | 0.1 |

TABLE 14

| | | Film Composition (atom %) | Coercive Force (Oe) |
|---|---|---|---|
| Example | ba | $(Fe_{75}Si_{19}Al_4Ti_2)_{92}O_2N_6$ | 0.2 |
| Example | bb | $(Fe_{73}Si_{19}Al_6Ti_2)_{94}O_1N_5$ | 0.2 |
| Example | bc | $(Fe_{73}Si_{19}Al_6Ti_2)_{92}O_2N_6$ | 0.2 |
| Example | bd | $(Fe_{73}Si_{19}Al_5Ti_3)_{94}O_1N_5$ | 0.2 |
| Example | be | $(Fe_{73}Si_{19}Al_5Ti_3)_{92}O_2N_6$ | 0.2 |
| Example | bf | $(Fe_{73}Si_{19}Al_3Ti_5)_{94}O_1N_5$ | 0.6 |
| Example | bg | $(Fe_{73}Si_{19}Al_3Ti_5)_{92}O_2N_6$ | 0.6 |
| Comp. Ex. | bh | $(Fe_{72}Si_{19}Al_2Ti_7)_{94}O_1N_5$ | 1.9 |
| Comp. Ex. | bi | $(Fe_{72}Si_{19}Al_2Ti_7)_{92}O_2N_6$ | 1.7 |
| Comp. Ex. | bj | $(Fe_{71}Si_{19}Al_4Ti_6)_{94}O_1N_5$ | 2.1 |
| Comp. Ex. | bk | $(Fe_{71}Si_{19}Al_4Ti_6)_{92}O_2N_6$ | 1.9 |
| Example | bl | $(Fe_{78}Si_{17}Al_3Ti_2)_{94}O_1N_7$ | 0.1 |
| Example | bm | $(Fe_{78}Si_{17}Al_3Ti_2)_{92}O_2N_8$ | 0.2 |
| Example | bn | $(Fe_{78}Si_{17}Al_3Ti_2)_{94}O_1N_5$ | 0.1 |
| Example | bo | $(Fe_{78}Si_{17}Al_3Ti_2)_{92}O_2N_6$ | 0.1 |
| Example | bp | $(Fe_{78}Si_{17}Al_3Ti_2)_{94}O_1N_3$ | 0.2 |
| Example | bq | $(Fe_{78}Si_{17}Al_3Ti_2)_{92}O_2N_4$ | 0.3 |
| Example | br | $(Fe_{77}Si_{17}Al_4Ti_2)_{94}O_1N_5$ | 0.2 |
| Example | bs | $(Fe_{77}Si_{17}Al_4Ti_2)_{92}O_2N_6$ | 0.1 |
| Example | bt | $(Fe_{76}Si_{17}Al_5Ti_2)_{94}O_1N_5$ | 0.2 |
| Example | bu | $(Fe_{76}Si_{17}Al_5Ti_2)_{92}O_2N_6$ | 0.2 |
| Example | bv | $(Fe_{75}Si_{17}Al_5Ti_3)_{94}O_1N_5$ | 0.2 |
| Example | bw | $(Fe_{75}Si_{17}Al_5Ti_3)_{92}O_2N_6$ | 0.3 |
| Example | bx | $(Fe_{85}Si_{10}Al_3Ti_2)_{94}O_1N_5$ | 0.3 |
| Example | by | $(Fe_{85}Si_{10}Al_3Ti_2)_{92}O_2N_6$ | 0.2 |
| Example | bz | $(Fe_{85}Si_{10}Al_3Ti_2)_{94}O_1N_5$ | 0.2 |

TABLE 15

| | | Film Composition (atom %) | Coercive Force (Oe) |
|---|---|---|---|
| Example | ca | $(Fe_{85}Si_{10}Al_3Ti_2)_{92}O_2N_6$ | 0.3 |
| Example | cb | $(Fe_{85}Si_{10}Al_3Ti_2)_{94}O_1N_5$ | 0.2 |
| Example | cc | $(Fe_{85}Si_{10}Al_3Ti_2)_{92}O_2N_6$ | 0.3 |
| Example | cd | $(Fe_{84}Si_{10}Al_4Ti_2)_{94}O_1N_5$ | 0.2 |
| Example | ce | $(Fe_{84}Si_{10}Al_4Ti_2)_{92}O_2N_6$ | 0.3 |
| Example | cf | $(Fe_{83}Si_{10}Al_5Ti_2)_{94}O_1N_5$ | 0.2 |
| Example | cg | $(Fe_{83}Si_{10}Al_5Ti_2)_{92}O_2N_6$ | 0.2 |
| Example | ch | $(Fe_{82}Si_{10}Al_5Ti_3)_{94}O_1N_5$ | 0.3 |
| Example | ci | $(Fe_{82}Si_{10}Al_5Ti_3)_{92}O_2N_6$ | 0.2 |
| Example | cj | $(Fe_{86}Si_9Al_3Ti_2)_{94}O_1N_5$ | 0.6** |
| Example | ck | $(Fe_{86}Si_9Al_3Ti_2)_{92}O_2N_6$ | 0.5** |

When all of the above samples were subjected to a salt-spraying test according to JIS, all the samples of Example 10 exhibited a satisfactory corrosion resistance. In Example 9, nitrogen was used as an added light element, whereas in Example 10, nitrogen and oxygen were used as added light elements. The comparison between Example 9 and Example 10 revealed that the addition of nitrogen and oxygen was more effective for improving the magnetic property than the addition of only nitrogen.

The samples of Examples aa and ab marked with * exhibited a satisfactory soft magnetic property and a satisfactory corrosion resistance, but the saturation magnetic flux density was as low as 1 T or less. However, the saturation magnetic flux density is higher than that of ferrite, and since the samples of Examples aa and ab have the most excellent corrosion resistance, they have sufficient characteristics for use in a magnetic coil. The sample of Example bd marked with * * exhibited a satisfactory soft magnetic property, but corroded slightly as a result of the salt-spraying test. However, the sample of Example bd has sufficient performance for use in a non-transportable VTR or a hard disc that is less demanding in terms of resistance against surroundings. The FeSiAiTiON material used in Example 10 further improves the magnetic property by forming a film of this material on the preferable underlying film of the present invention.

Furthermore, it was confirmed that, even when Ti was partially or totally substituted with at least one selected from the group consisting of Ta, Zr, Hf, V, Nb, and Cr; Si was partially or totally substituted with Ge; or Al was partially or totally substituted with Ga or Cr, the magnetic film also had excellent corrosion resistance and magnetic property.

Furthermore, when the magnetic film of the present example was formed so as to comprise branched crystal grains with the preferable size by sputtering that allows more components to be introduced obliquely, the same effect also was confirmed.

Example 11

In general, a metal magnetic film formed on ferrite corrodes gradually due to a local-cell effect formed by interaction with the ferrite or a gap effect at the interface between the film and the ferrite, so that a change in the function as a magnetic head is caused over time. In Example 11, in order to confirm reliability as a magnetic head, an MIG head was produced, and the self-recording/reproducing characteristics of the MIG head were evaluated. Then the MIG head was subjected to a salt-spraying test to observe a change of the magnetic property after the test. For comparison, a change of the characteristics of an MIG head produced with sendust (FeAlSi/underlying layer Bi) as the metal core is shown.

The specification of the head are as follows:

Head specification

Track width: 17 μm

Gap depth: 12.5 μm

Gap length: 0.2 μm

Turn number N: 16

Barrier film on ferrite: alumina 4 nm

Magnetic film thickness: 4.5 μm

C/N characteristics:

Relative rate=10.2 m/s

Recording/reproducing frequency=20.9 MHz

Tape: MP tape

TABLE 16

| Core Magnetic Thin Film | Recording /Reproducing Output Level (dB) | Recording /Reproducing Output Level after Salt-Spraying (dB) |
|---|---|---|
| $(Fe_{76}Si_{19}Al_3Ti_2)_{93}O_1N_6$ | +58.5 | +58.6 |
| $(Fe_{76}Si_{19}Al_3Ti_2)_{92}N_8$ | +57.6 | +57.7 |
| $(Fe_{76}Si_{19}Al_3V_2)_{93}O_1N_6$ | +57.8 | +57.6 |
| $(Fe_{76}Si_{19}Al_3V_2)_{92}N_8$ | +58.0 | +57.9 |

TABLE 16-continued

| Core Magnetic Thin Film | Recording /Reproducing Output Level (dB) | Recording /Reproducing Output Level after Salt-Spraying (dB) |
|---|---|---|
| $(Fe_{77}Si_{19}Al_3Ta_1)_{92}N_8$ | +58.2 | +58.0 |
| $(Fe_{76}Si_{19}Al_3Nb_2)_{92}N_8$ | +57.7 | +58.8 |
| $Fe_{73}Si_{18}Al_9$ | +56 | +50 |

As described above, when the magnetic film of the present invention is used for the magnetic head, it enhances the head characteristics and provides a magnetic head with high reliability.

Example 12

In Example 12, various underlying films were formed on a rough substrate by RF magnetron sputtering, and the underlying films were examined so as to obtain an underlying film excellent in the suppression of substrate breakage and the magnetic property.

First, 100 rough portions of 15 μm×2 mm×15 μm (thickness: 15 μm) were formed on a ferrite substrate of 2 mm×28 mm×1 mm (thickness: 1 mm) so as to prepare a substrate for breakage test. An alumina barrier layer with a thickness of 3 nm was formed on the test substrate, and then various underlying films with 100 nm were produced while controlling the diameter of crystal grains by changing the amount of nitrogen, oxygen, Nb, Y or Hf. Then, a FeSiAlTiON film with a thickness of 10 μm was formed thereon as the uppermost film. After this magnetic thin film was subjected to a heat treatment at 520° C., only the film was removed by chemical etching, and the breakage ratios of the rough portions of the substrate were evaluated. On the other hand, a single layer of each underlying film with a thickness of 3 μm was formed on a smooth glass substrate, and the average diameter of the crystal grains after the heat treatment was examined with an XRD. Table 17 shows the breakage ratio and the average crystal grain diameter.

The film-forming conditions for the underlying film are as follows:

Film-forming conditions for the underlying film provided with nitrogen

Substrate temperature: water cooling

Target: FeSiAlTi

Target size: 5×15 inch

Discharge gas pressure: 8 mTorr

Main sputtering gas: Ar

Nitrogen flow ratio: 2 to 20%

Oxygen flow ratio: 0%

Discharge power: 2 kW

Film-forming conditions for the underlying film provided with oxygen

Substrate temperature: water cooling

Target: FeSiAlTi

Target size: 5×15 inch

Discharge gas pressure: 8 mTorr

Main sputtering gas: Ar

Nitrogen flow ratio: 0%

Oxygen flow ratio: 2 to 10%

Discharge power: 2 kW

Film-forming conditions for the underlying film provided with Nb, Y or Hf

Substrate temperature: water cooling
Target: a plurality of Nb, Y or Hf chips of 10 mm×10 mm placed on FeSiAl target
Target size: 5×15 inch
Discharge gas pressure: 8 mTorr
Main sputtering gas: Ar
Nitrogen flow ratio: 0%
Oxygen flow ratio: 0%
Discharge power: 2 kW

TABLE 17

| Sample | Additive | Average Grain Size (nm) | Breakage Ratio (%) |
|---|---|---|---|
| a | Nitrogen | 30 | 80 |
| b | " | 20 | 15 |
| c | " | 10 | 11 |
| d | " | 5 | 0 |
| e | Oxygen | 25 | 56 |
| f | " | 18 | 10 |
| g | " | 7 | 2 |
| h | " | 6 | 0 |
| i | Nb | 28 | 75 |
| j | " | 15 | 12 |
| k | " | 5 | 5 |
| l | " | 3 | 0 |
| m | Y | 25 | 22 |
| n | " | 18 | 13 |
| o | " | 9 | 5 |
| p | " | 4 | 2 |
| q | Hf | 26 | 37 |
| r | " | 18 | 15 |
| s | " | 8 | 6 |
| t | " | 6 | 3 |

Example 12 confirmed that the breakage of the substrate can be suppressed when the underlying film has an average crystal grain diameter of 20 nm or less, regardless of the material of the underlying film.

In view of these results, the following MIG head was produced, using an underlying film provided with nitrogen with a thickness of 100 nm having crystal grains with average diameter of 30 nm or 20 nm. The results are shown in Table 18.

The specification of the head is as follows:
Head specification
Track width: 17 $\mu$m
Gap depth: 12.5 $\mu$m
Gap length: 0.2 $\mu$m
Turn number N: 16
Barrier layer on ferrite: alumina 3 nm
Magnetic film thickness: 9 $\mu$m
C/N characteristics:
Relative rate=10.2 m/s
Recording/reproducing frequency=20.9 MHz
Tape: MP tape

TABLE 18

| Core Magnetic Thin Film | Crystal Grain Diameter (nm) | Recording/ Reproducing Output Level (dB) | Ripple Level (dB) |
|---|---|---|---|
| $(Fe_{76}Si_{19}Al_3Ti_2)_{94}O_1N_5$ | 20 | +58.3 | 0.2 |
| $(Fe_{76}Si_{19}Al_3Ti_2)_{94}O_1N_5$ | 30 | +54.3 | 1.5 |

As described above, when the underlying film is within the preferable range of the present invention, the characteristics of the magnetic head are improved.

Next, an underlying layer (an underlying layer A) with a thickness of 2 nm was formed on an underlying layer (an underlying layer B) with a thickness of 100 nm having crystal grains with a diameter of 20 nm that have been made smaller by the addition of nitrogen, whose effect is apparent from Table 18. The crystal grains of the underlying layer were made smaller to a diameter of 2 nm by increasing the amount of nitrogen added. Then, a magnetic head was produced therefrom under the same conditions as above. Similarly, an underlying layer (an underlying layer A) with a thickness of 30 nm was formed on an underlying layer (an underlying layer B) with a thickness of 100 nm having crystal grains with a diameter of 20 nm that have been made smaller by the addition of nitrogen. In the latter case, the amount of nitrogen added to the underlying layer A was reduced gradually up to the amount for a magnetic film that will be formed thereon. Then, a magnetic head was produced therefrom under the same conditions as above. The results are shown in Table 19.

TABLE 19

| Core Magnetic Thin Film | Nitrogen Amount of Underlying Layer A to Underlying Layer B | Recording/Reproducing Output Level (dB) | Ripple Level (dB) |
|---|---|---|---|
| $(Fe_{76}Si_{19}Al_3Ti_2)_{94}O_1N_5$ | up | +59.3 | 0.3 |
| $(Fe_{76}Si_{19}Al_3Ti_2)_{94}O_1N_5$ | down | +59.5 | 0.5 |

As described above, when the underlying film is within the preferable range of the present invention, the characteristics of the magnetic head are further improved.

Next, the underlying layers having fine crystal grains (fine-structure magnetic film) shown in Table 17 were immersed in 0.5 normal salt water for 100 hours. As a result, a film provided with nitrogen and a film provided with oxygen having crystal grains as small as 5 nm corroded slightly. However, the samples of underlying layers having smaller crystal having smaller crystal grains provided with elements of Group IIIa (Y), Group IVa (Hf), and Group Va (Nb) did not corrode at all.

Next, in order to obtain an optimum thickness of the underlying film, a breakage ratio was examined by changing the thickness of the underlying layer provided with nitrogen from 1 to 500 nm. The results are shown in Table 20. As for the conditions for producing the underlying layer provided with nitrogen, the conditions for an average crystal diameter of 20 nm was chosen.

TABLE 20

| Sample | Additive | Underlying Film Thickness (dB) | Breakage Ratio (%) |
|---|---|---|---|
| a | Nitrogen | 1 | 100 |
| b | " | 5 | 95 |
| c | " | 10 | 24 |
| d | " | 30 | 20 |
| e | " | 100 | 15 |
| f | " | 300 | 0 |
| g | " | 500 | 0 |

The examples described above confirmed that a preferable thickness for the fine-structure magnetic film is 10 nm or more, and a more preferable thickness is 300 nm or more. In Example 12, ferrite was used as the substrate, and a magnetic body was used as the film. However, the underlying film having smaller crystal grains of the present invention is basically effective for a thin film as a whole where internal stress is present.

As described above, according to the magnetic thin film of the above embodiment of the present invention, the total amount of interface energy per unit volume is small, compared with a conventional microcrystal material having crystal grains with a small diameter. Therefore, the grain growth by a heat treatment can be suppressed, and the soft magnetic property can be stabilized in a wide range of temperatures. Moreover, the magnetic film is crystalline immediately after the film was formed. Accordingly, the saturation magnetic flux density can be high, and the magnetic film can be used as a material for a high saturation magnetic flux density head immediately after the film was formed. In addition, the small size of the crystal grain makes it possible to obtain the magnetic film that barely corrodes due to local cell and has excellent corrosion resistance.

Furthermore, according to the preferable embodiment of the present invention where the underlying film between the substrate and the magnetic film comprises a layer having small crystal grains, the film is less likely to be peeled off the substrate, and the substrate is less likely to be cracked, regardless of the state or the shape of the surface of the substrate.

The invention may be embodied in other forms without departing from the spirit or essential characteristics thereof The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A soft magnetic thin film comprising a soft magnetic film including magnetic crystal grains as a mother phase, wherein the magnetic crystal grains have an approximately columnar or needle shape or a branched shape composed of the combination of approximately columnar or needle shapes, and the magnetic crystal grains have an average maximum length more than 50 nm, and an average crystal size in a short direction of the approximately columnar or needle shape is more than 5 nm and less than 60 nm.

2. A soft magnetic thin film according to claim 1, wherein the magnetic crystal grains have approximately columnar or needle shape, and an average crystal size dS in a short direction of the magnetic crystal grain and an average crystal size dL in a longitudinal direction of the magnetic crystal grain satisfy the following inequalities, respectively:

$$5\ nm<dS<60\ nm$$

$$dL>100\ nm.$$

3. A soft magnetic thin film according to claim 1, wherein the magnetic crystal grains include branched crystal grains composed of the combination of approximately columnar or needle shapes, and an average crystal size ds in a short direction of the approximately columnar or needle shape and an average maximum length dl of the branched crystal grains satisfy the following inequalities, respectively:

$$5\ nm<ds<60\ nm$$

$$dl>50\ nm.$$

4. The soft magnetic thin film according to claim 1, wherein crystal orientations of adjacent magnetic crystal grains are different from each other at least in an inplane direction.

5. The soft magnetic thin film according to claim 1, wherein the soft magnetic thin film comprises at least one element selected from the group consisting of C, B, O and N, and an element having a lower free energy for the formation of an oxide and/or a nitride than Fe.

6. The soft magnetic thin film according to claim 1, wherein the magnetic crystal grains comprise an element having a lower free energy for the formation of an oxide and/or a nitride than Fe.

7. The soft magnetic thin film according to claim 5, wherein the element having a lower free energy for the formation of an oxide and/or a nitride than Fe is at least one element selected from the group consisting of elements of Group IVa, elements of Group Va, Al, Ga, Si, Ge and Cr.

8. The soft magnetic thin film according to claim 1, wherein a microcrystal or amorphous grain boundary compound formed of at least one selected from the group consisting of a carbide, a boride, an oxide, a nitride and a metal is present at a boundary of the magnetic crystal grains.

9. The soft magnetic thin film according to claim 8, wherein an average minimum length T of at least 30% of the grain boundary compounds satisfies the following inequality:

$$0.1\ nm \leqq T \leqq nm\ .$$

10. The soft magnetic thin film according to claim 1, comprising an underlying film formed of at least one layer and a soft magnetic film formed on the underlying film, wherein at least one layer of the underlying film contains an element having a lower free energy for the formation of an oxide and/or a nitride than Fe.

11. The soft magnetic thin film according to claim 1, comprising an underlying film formed of at least one layer and a soft magnetic film formed on the underlying film, wherein at least a layer in contact with the soft magnetic film among layers forming the underlying film is formed of a substance having a lower surface free energy than Fe.

12. The soft magnetic thin film according to claim 1, comprising an underlying film formed of at least one layer and a soft magnetic film formed on the underlying film, wherein at least a layer in contact with the soft magnetic film of the at least one layer forming the underlying film is formed of a compound of any one selected from the group consisting of a carbide, an oxide, a nitride and a boride of at least one element selected from the group consisting of Al, Ba, Ca, Mg, Si, Ti, V, Zn, Ga and Zr.

13. The soft magnetic thin film according to claim 1, comprising an underlying film formed of at least one layer and a soft magnetic film formed on the underlying film, wherein at least a layer in contact with the soft magnetic film of the at least one layer forming the underlying film is formed of at least one substance selected from the group consisting of C, Al, Si, Ag, Cu, Cr, Mg, Au, Ga and Zn.

14. The soft magnetic thin film according to claim 1, comprising an underlying film formed of at least one layer and a soft magnetic film formed on the underlying film, the underlying film comprising an underlying layer A in contact with the soft magnetic film and an underlying layer B in contact with the underlying film A, wherein the underlying layer B is formed of at least one substance selected from the group consisting of Al, Ba, Ca, Mg, Si, Ti, V, Zn, Ga and Zr, and the underlying layer A is formed of a compound of any one selected from the group consisting of a carbide, an oxide, a nitride and a boride of the substance forming the underlying layer B.

15. The soft magnetic thin film according to claim 1, comprising an underlying film formed of at least one layer and a soft magnetic film formed on the underlying film, the underlying film comprising an underlying layer A in contact with the soft magnetic film and an underlying layer B in contact with the underlying film A, wherein the underlying layer A is formed of at least one substance selected from the group consisting of Al, Ba, Ca, Mg, Si, Ti, V, Zn, Ga and Zr, and the underlying layer B is formed of a compound of any one selected from the group consisting of a carbide, an oxide, a nitride and a boride of the substance forming the underlying layer A.

16. The soft magnetic thin film according to claim 1, comprising an underlying film formed of at least one layer and a soft magnetic film formed on the underlying film, the underlying film comprising an underlying layer A in contact with the soft magnetic film and an underlying layer B in contact with the underlying film wherein the underlying layer A comprises of at least one element selected from main component elements contained in the soft magnetic film and at least one element selected from the group consisting of oxygen and nitrogen, and comprises more oxygen or nitrogen than the soft magnetic film, and the underlying layer B is formed of a compound of any one selected from the group consisting of a carbide, an oxide, a nitride and a boride.

17. The soft magnetic thin film according to claim 1, comprising an underlying film formed of at least one layer and a soft magnetic film formed on the underlying film, the underlying film comprising an underlying layer A in contact with the soft magnetic film and an underlying layer B in contact with the underlying film A, wherein the underlying layer A comprises at least one secondary magnetic layer and at least one parting layer, the secondary magnetic layer and the parting layer being laminated alternately, and the underlying layer B is formed of a compound of any one selected from the group consisting of a carbide, an oxide, a nitride and a boride.

18. The soft magnetic thin film according to claim 17, wherein the parting layer comprises at least one element common to the soft magnetic film, and more oxygen or nitrogen than the soft magnetic film.

19. The soft magnetic thin film according to claim 17, wherein a thickness of the secondary magnetic layer $t_M$ and a thickness of the parting layer $t_S$ satisfy the following inequalities:

$$0.5\ \text{nm} \leqq t_M \leqq 100\ \text{nm}$$

$$0.05\ \text{nm} \leqq t_S \leqq 10\ \text{nm}.$$

20. The soft magnetic thin film according to claim 1, comprising a substrate, an underlying film formed of at least one layer formed on the substrate and a soft magnetic film formed on the underlying film, wherein among the underlying films, at least a layer in contact with the substrate is a fine-structure magnetic layer comprising a magnetic amorphous body or magnetic crystal grains whose average grain diameter d satisfies the following inequality as a mother phase:

$$d \leqq 20\ \text{nm}.$$

21. The soft magnetic thin film according to claim 20, wherein a thickness of the fine-structure magnetic layer $t_r$ and a thickness of the soft magnetic film $t_f$ satisfy the following inequality:

$$10\ \text{nm} < t_r < t_f/3.$$

22. The soft magnetic thin film according to claim 20, wherein the fine-structure layer comprises at least one element common to the soft magnetic film.

23. The soft magnetic thin film according to claim 22, wherein the common element comprises an element having a lowest free energy for the formation of an oxide and/or a nitride among elements contained in the fine-structure magnetic layer or the soft magnetic film.

24. The soft magnetic thin film according to claim 22, wherein the common element is at least one element selected from the group consisting of oxygen, nitrogen, carbon and boron.

25. The soft magnetic thin film according to claim 20, wherein the fine-structure magnetic layer comprises at least one element selected from the group consisting of elements of Group IIIa, Group IVa, and Group Va.

26. The soft magnetic thin film according to claim 1, comprising an underlying film formed of at least one layer and a soft magnetic film formed on the underlying film, the underlying film comprising an underlying layer A in contact with the soft magnetic film and an underlying layer B in contact with the underlying layer A, wherein a concentration $C_1$ (atomic %) of an element group consisting of oxygen, nitrogen, carbon and boron in the soft magnetic film, a concentration $C_2$ (atomic %) of an element group consisting of oxygen, nitrogen, carbon and boron in the underlying layer A, and a concentration $C_3$ (atomic %) of an element group consisting of oxygen, nitrogen, carbon and boron in the underlying layer B satisfy the following inequality:

$$0 \leqq C_1 \leqq C_3 < C_2.$$

27. The soft magnetic thin film according to claim 1, comprising an underlying film formed of at least one layer and a soft magnetic film formed on the underlying film, the underlying film comprising an underlying layer A in contact with the soft magnetic film and an underlying layer B in contact with the underlying layer A, wherein a concentration $C_1$ (atomic %) of an element group consisting of oxygen, nitrogen, carbon and boron in the soft magnetic film, a concentration $C_2$ (atomic %) of an element group consisting of oxygen, nitrogen, carbon and boron in the underlying layer A, and a concentration $C_3$ (atomic %) of an element group consisting of oxygen, nitrogen, carbon and boron in the underlying layer B satisfy the following inequality:

$$0 \leqq C_1 \leqq C_2 \leqq C_3.$$

28. The soft magnetic thin film according to claim 27, wherein the element group concentrations $C_1$ and $C_3$ are different from each other, and the element group concentration $C_2$ substantially continuously changes in a thickness direction so as to reduce a concentration different at an interface between the layers.

29. The soft magnetic thin film according to claim 20, which is formed on a substrate with convexities or concavities.

30. The soft magnetic thin film according to claim 26, which is formed on a substrate with convexities or concavities.

31. The soft magnetic thin film according to claim 27, which is formed on a substrate with convexities or concavities.

32. The soft magnetic thin film according to claim 1, which is formed on a high resistance material.

33. The soft magnetic thin film according to claim 1, which is formed on a substrate provided with a barrier layer, wherein the barrier layer is formed of an oxide or a nitride of at least one element selected from the group consisting of Al, Si, Cr and Zr, and has a thickness du satisfying the following inequality:

$$0.5\ \text{nm} < du < 10\ \text{nm}.$$

34. The soft magnetic thin film according to claim 1, comprising a soft magnetic film having a composition expressed by $(M_aX^1_bZ^1_c)_{100-d}A_d$, wherein M is at least one magnetic metal element selected from the group consisting of Fe, Co and Ni, $X^1$ is at least one element selected from the group consisting of Si, Al, Ga and Ge, $Z^1$ is at least one element selected from the group consisting of elements of Group IVa, Group Va and Cr, A is at least one element selected from the group consisting of O and N, and a, b, c and d are values satisfying the following inequalities:

$$0.1 \leqq b \leqq 26$$

$$0.1 \leqq c \leqq 5$$

$$a+b+c=100$$

$$1 \leqq d \leqq 10.$$

35. The soft magnetic thin film according to claim 1, comprising a soft magnetic film having a composition expressed by $(M_aX^2_bZ^2_c)_{100-d}A_d$, wherein M is at least one magnetic metal element selected from the group consisting of Fe, Co and Ni, $X^2$ is at least one element selected from the group consisting of Si, and Ge, $Z^2$ is at least one element selected from the group consisting of elements of Group IVa, Group Va, Al, Ga and Cr, A is at least one element selected from the group consisting of O and N, and a, b, c and d are values satisfying the following inequalities:

$$0.1 \leqq b \leqq 23$$

$$0.1 \leqq c \leqq 10$$

$$a+b+c=100$$

$$1 \leqq d \leqq 10.$$

36. The soft magnetic thin film according to claim 1, comprising a soft magnetic film having a composition expressed by $(Fe_aSi_bAl_cT_d)_{100-e}N_e$, wherein T is at least one element selected from the group consisting of Ti and Ta, and a, b, c, d and e are values satisfying the following inequalities:

$$10 \leqq b \leqq 23$$

$$0.1 \leqq d \leqq 7$$

$$0.1 \leqq c+d \leqq 10$$

$$a+b+c+d=100$$

$$1 \leqq e \leqq 10.$$

37. The soft magnetic thin film according to claim 1, comprising a soft magnetic film having a composition expressed by $(Fe_aSi_bAl_cTi_d)_{100-e-f}N_eO_f$, wherein a, b, c, d, e, and f are values satisfying the following inequalities:

$$10 \leqq b \leqq 23$$

$$0.1 \leqq d \leqq 5$$

$$0.1 \leqq c+d \leqq 8$$

$$a+b+c+d=100$$

$$1 \leqq e+f \leqq 10$$

$$0.1 \leqq f \leqq 5.$$

38. A magnetic device comprising a soft magnetic thin film comprising a soft magnetic film including magnetic crystal grains as a mother phase, wherein the magnetic crystal grains have an approximately columnar or needle shape or a branched shape composed of the combination of approximately columnar or needle shapes, and the magnetic crystal grains have an average maximum length more than 50 nm, and an average crystal size in a short direction of the approximately columnar or needle shape is more than 5 nm and less than 60 nm.

39. A soft magnetic thin film comprising a soft magnetic film having a composition expressed by $(M_aX^1_bZ^1_c)_{100-d}A_d$, wherein M is at least one magnetic metal element selected from the group consisting of Fe, Co and Ni, $X^1$ is at least one element selected from the group consisting of Si, Al, Ga and Ge, $Z^1$ is at least one element selected from the group consisting of elements of Group IVa, Group Va and Cr, A is at least one element selected from the group consisting of O and N, and a, b, c and d are values satisfying the following inequalities:

$$0.1 \leqq b \leqq 26$$

$$0.1 \leqq c \leqq 5$$

$$a+b+c=100$$

$$1 \leqq d \leqq 10$$

wherein the soft magnetic film includes magnetic crystal grains as a mother phase, wherein the magnetic crystal grains have an average volume Va and an average surface area Sa satisfying the following inequality:

$$Sa > 4.84\ Va^{2/3}.$$

40. A soft magnetic thin film according to claim 39, wherein the magnetic crystal grains have an approximately columnar or needle shape or a branched shape composed of the combination of approximately columnar or needle shapes.

41. A soft magnetic thin film comprising a soft magnetic film having a composition expressed by $(M_aX^2_bZ^2_c)_{100-d}A_d$, wherein M is at least one magnetic metal element selected from the group consisting of Fe, Co and Ni, $X^2$ is at least one element selected from the group consisting of Si, and Ge, $Z^2$ is at least one element selected from the group consisting of elements of Group IVa, Group Va, Al, Ga and Cr, A is at least one element selected from the group consisting of O and N, and a, b, c and d are values satisfying the following inequalities:

$$0.1 \leqq b \leqq 23$$

$$0.1 \leqq c \leqq 10$$

$$a+b+c=100$$

$$1 \leqq d \leqq 10$$

wherein the soft magnetic film includes magnetic crystal grains as a mother phase, wherein the magnetic crystal grains have an average volume Va and an average surface area Sa satisfying the following inequality:

$$Sa>4.84\ Va^{2/3}.$$

42. A soft magnetic thin film according to claim 41, wherein the magnetic crystal grains have an approximately columnar or needle shape or a branched shape composed of the combination of approximately columnar or needle shapes.

43. A soft magnetic thin film comprising a soft magnetic film having a composition expressed by $(Fe_aSi_bAl_cT_d)_{100-e}N_e$, wherein T is at least one element selected from the group consisting of Ti and Ta, and a, b, c, d and e are values satisfying the following inequalities:

$$10\leqq b\leqq 23$$

$$0.1\leqq d\leqq 7$$

$$0.1\leqq c+d\leqq 10$$

$$a+b+c+d=100$$

$$1\leqq e\leqq 10$$

wherein the soft magnetic film includes magnetic crystal grains as a mother phase, wherein the magnetic crystal grains have an average volume Va and an average surface area Sa satisfying the following inequality:

$$Sa>4.84\ Va^{2/3}.$$

44. A soft magnetic thin film according to claim 43, wherein the magnetic crystal grains have an approximately columnar or needle shape or a branched shape composed of the combination of approximately columnar or needle shapes.

45. A soft magnetic thin film comprising a soft magnetic film having a composition expressed by $(Fe_aSi_bAl_cTi_d)_{100-e-f}N_eO_f$, wherein a, b, c, d, e, and f are values satisfying the following inequalities:

$$10\leqq b\leqq 23$$

$$0.1\leqq d\leqq 5$$

$$0.1\leqq c+d\leqq 8$$

$$a+b+c+d=100$$

$$1\leqq e+f\leqq 10$$

$$0.1\leqq f\leqq 5$$

wherein the soft magnetic film includes magnetic crystal grains as a mother phase, wherein the magnetic crystal grains have an average volume Va and an average surface area Sa satisfying the following inequality:

$$Sa>4.84\ Va^{2/3}.$$

46. A soft magnetic thin film according to claim 45, wherein the magnetic crystal grains have an approximately columnar or needle shape or a branched shape composed of the combination of approximately columnar or needle shapes.

* * * * *